(12) United States Patent
Browne

(10) Patent No.: US 11,708,285 B2
(45) Date of Patent: Jul. 25, 2023

(54) SCALE REDUCTION CARTRIDGE SYSTEM

(71) Applicant: NATIONAL MACHINE COMPANY, Stow, OH (US)

(72) Inventor: Ronnie Browne, Aurora, OH (US)

(73) Assignee: NATIONAL MACHINE COMPANY, Stow, OH (US)

( * ) Notice: Subject to any disclaimer, the term of this patent is extended or adjusted under 35 U.S.C. 154(b) by 625 days.

(21) Appl. No.: 16/326,299

(22) PCT Filed: Aug. 8, 2017

(86) PCT No.: PCT/US2017/047522
§ 371 (c)(1),
(2) Date: Feb. 18, 2019

(87) PCT Pub. No.: WO2018/035417
PCT Pub. Date: Feb. 22, 2018

(65) Prior Publication Data
US 2019/0210903 A1    Jul. 11, 2019

Related U.S. Application Data

(60) Provisional application No. 62/376,668, filed on Aug. 18, 2016.

(51) Int. Cl.
*C02F 5/02* (2023.01)
*C02F 5/08* (2023.01)
(Continued)

(52) U.S. Cl.
CPC ............... *C02F 5/02* (2013.01); *C02F 1/467* (2013.01); *C02F 1/5281* (2013.01); *C02F 1/688* (2013.01);
(Continued)

(58) Field of Classification Search
CPC .... C02F 5/02; C02F 5/08; C02F 1/688; C02F 1/467; C02F 1/5281; C02F 2303/22;
(Continued)

(56) References Cited

U.S. PATENT DOCUMENTS 5,507,945 A    4/1996  Hansen
6,096,197 A    8/2000  Hughes
(Continued)

FOREIGN PATENT DOCUMENTS

FR    2638100 A1    4/1990
WO    WO-1989000977 A1 *  2/1989  ........... B01D 24/007
WO    WO-2005087339 A1 *  9/2005  ............. B01D 15/22

OTHER PUBLICATIONS

Extended European Search Report Application No. EP 17 84 2182, Search date Jan. 13, 2020. Place of Search: The Hague. Examiner of Search: Agnieszka Rozanska. 9 pages.
(Continued)

*Primary Examiner* — Hayden Brewster
(74) *Attorney, Agent, or Firm* — Vorys, Sater, Seymour and Pease LLP; Mark A. Watkins

(57) ABSTRACT

This invention relates in general to a system for treating hard water encountered in aircraft potable water equipment; such as hot water heaters and, more particularly, to the prevention of scale deposits in aircraft lavatory and galley heated water system components by installing a unique scale reduction system. The scale reduction system generally comprised of a housing with a modular cartridge inserted therein. The cartridge is porous and contains a chemical composition within its inner cavity, and this chemical composition is mixed with untreated inlet fluid flow so that the outlet flow is of a sufficiently diluted concentration. Various chemical compositions may be utilized to counteract any number of conditions that affect potable water equipment and, in one
(Continued)

embodiment, a water softening agent is utilized to combat scale build-up in aircraft plumbing.

20 Claims, 21 Drawing Sheets

(51) Int. Cl.
*C02F 1/68* (2023.01)
*C02F 1/467* (2023.01)
*C02F 1/52* (2023.01)

(52) U.S. Cl.
CPC ........ *C02F 5/08* (2013.01); *C02F 2001/5218* (2013.01); *C02F 2201/001* (2013.01); *C02F 2201/006* (2013.01); *C02F 2303/22* (2013.01)

(58) Field of Classification Search
CPC ........ C02F 2001/5218; C02F 2201/001; C02F 2201/006; B64D 11/02; B64D 11/04; B01F 1/0027
USPC ....... 137/268; 210/94, 198.1, 206, 232, 264, 210/266, 282, 287, 420, 435, 443, 449, 210/460, 615, 664, 670, 764, 767; 222/190; 239/310; 366/131, 189, 261, 366/267, 341
See application file for complete search history.

(56) References Cited

U.S. PATENT DOCUMENTS

| | | |
|---|---|---|
| 2004/0108262 A1 | 6/2004 | Brandreth, III |
| 2004/0228212 A1 | 11/2004 | de Goor et al. |
| 2006/0175262 A1 | 8/2006 | Martin |
| 2009/0031702 A1* | 2/2009 | Robel ................. F01N 13/0093 60/297 |
| 2010/0012590 A1 | 1/2010 | Slark |
| 2010/0243581 A1 | 9/2010 | Williams et al. |
| 2011/0263021 A1* | 10/2011 | Stobbe ................ F04B 43/0736 435/243 |
| 2014/0014567 A1 | 1/2014 | Boodaghians et al. |
| 2015/0377861 A1* | 12/2015 | Pant ................... G01N 33/5008 435/395 |

OTHER PUBLICATIONS

International Searching Authority. Preliminary Report on Patentability for International Application No. PCT/US2017/047522, International Filing Date Aug. 18, 2017. Authorized Officer Agnes Wittmann-Regis, dated Feb. 28, 2019. Written Opinion for International Application No. PCT/US2017/047522. International Filing Date Aug. 18, 2017. Authorized Officer, Lee W. Young.

* cited by examiner

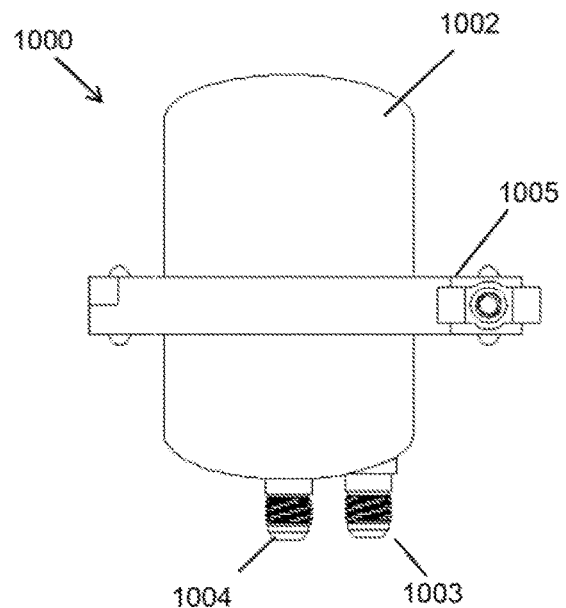
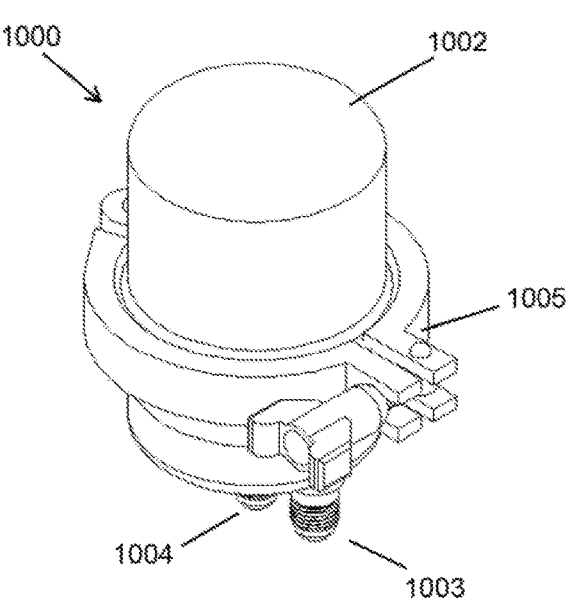
FIG. 10B
FIG. 10C
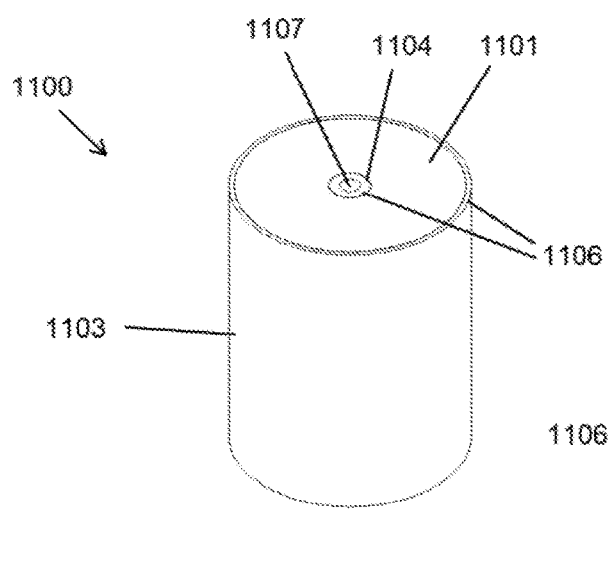
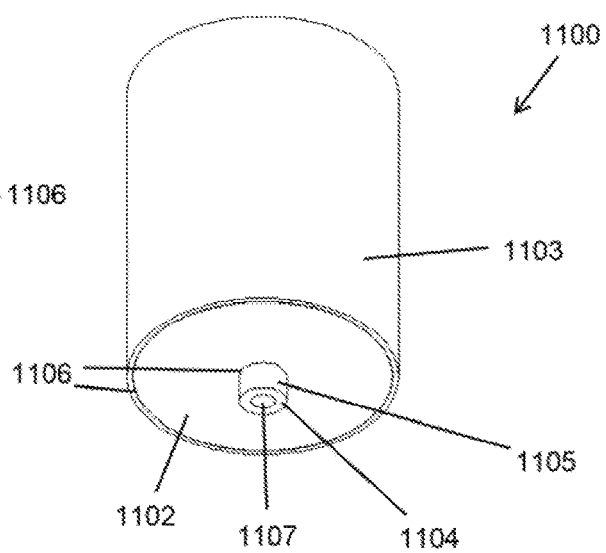
FIG. 11A
FIG. 11B

SCALE REDUCTION CARTRIDGE SYSTEM

This application is a 371 National Stage of International Application No. PCT/US2017/047522, filed Aug. 18, 2017, which claims priority to and the benefit of U.S. Provisional Application No. 62/376,668, filed Aug. 18, 2016, all of which are incorporated by reference herein in their entirety.

BACKGROUND OF THE INVENTION

Heated water is customarily provided in commercial aircraft lavatories for washing hands and in commercial aircraft galleys for hot beverages and meal preparation. Over time, scale deposits build up on the walls of heating elements and anti-scalding valve components, thereby reducing their thermal performance. These scale deposits inside water systems are also sites for bacteria growth.

Many of the solutions used by the housing industry to protect on-demand hot water heating systems from scale are not tailored for use aboard aircraft, as they are bulky and were designed with no consideration about weight or maintenance. A need therefore exists to address scale and other issues by packaging known agents such as commercial softeners into a configuration suitable for use in aircraft water systems to treat hard water.

The proposed invention therefore addresses such issues by packaging template assisted crystallization (TAC) technology with proven chemical agents into a configuration that is appropriate for use in aircraft water systems to treat hard water.

SUMMARY OF THE INVENTION

Presently disclosed is an anti-scale or scale reduction cartridge for use in aircraft potable water systems, such as lavatories and gallery hot water heaters. In one embodiment, the scale reduction cartridge system comprised of a housing with a modular media cartridge inserted therein. The media cartridge contains a chemical composition within its inner cavity, and this chemical composition will be mixed with untreated inlet fluid flow to produce a chemical solution of a desired concentration, for example, to reduce scale formation. The cartridge comprises a first porous plate, a second porous plate, and a porous sidewall disposed between and perpendicular to the first and second porous plates. The first and second porous plates have a first and second porosity, whereas the porous sidewalls have a third porosity. In one embodiment, the first and second porosity are equal and greater than the third porosity.

BRIEF DESCRIPTION OF THE FIGURES

FIG. 5B is a cut-away side view of the cartridge of FIG. 5a depicting the flow there through, whereas FIG. 5C is a cut-away side view of the scale reduction cartridge system depicting the flow there through.

FIG. 7B is a side view of the in-line scale reduction cartridge system of FIG. 7A, whereas

FIG. 10B is a side view of the point of use scale reduction cartridge system of FIG. 10A. FIG. 10C is a top isometric view of the point of use scale reduction cartridge system of FIGS. 10A and 10B.

FIG. 11A is a top isometric view of the cartridge utilized in the point of use scale reduction cartridge system of FIGS. 10A through 10C. FIG. 11B is a bottom isometric view of the cartridge utilized in the point of use scale reduction cartridge system of FIGS. 10A through 10C.

DETAILED DESCRIPTION

This invention relates in general to a system for treating hard water encountered in airplane potable water sources, such as hot water heaters and, more particularly, to the prevention of scale deposits in aircraft lavatory and galley heated water system components by installing a unique scale reduction system.

Figure 1:
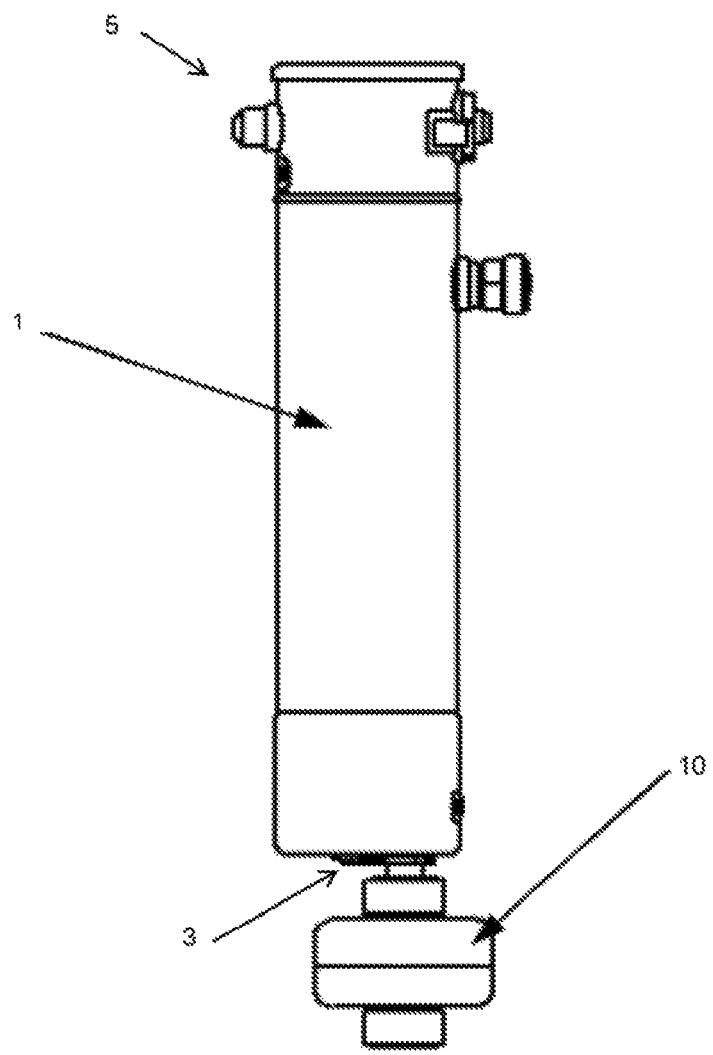
FIG. 1 is a view of an exemplary scale reduction cartridge system connected to an airplane hot water heater.

Referring generally to FIGS. 1-6, disclosed is an exemplary scale reduction system 10 for use with aircraft fluid systems such as aircraft potable water sources. FIG. 1 depicts one such aircraft potable water source, an exemplary airplane lavatory or galley hot water tank 1. The tank 1 has an inlet 3 and an outlet 5, and FIG. 1 depicts the scale reduction system 10 being connected to the inlet 3. In application, the outlet 5 of the hot water tank 1 may be connected with any number of hot water dispensers encountered on commercial (or noncommercial) airplanes, such as a sink, coffee maker, or other device utilizing heated water. FIG. 1, however, does not depict the outlet 5 being connected to any of these other fluid systems.

Figures 2A, 2B:
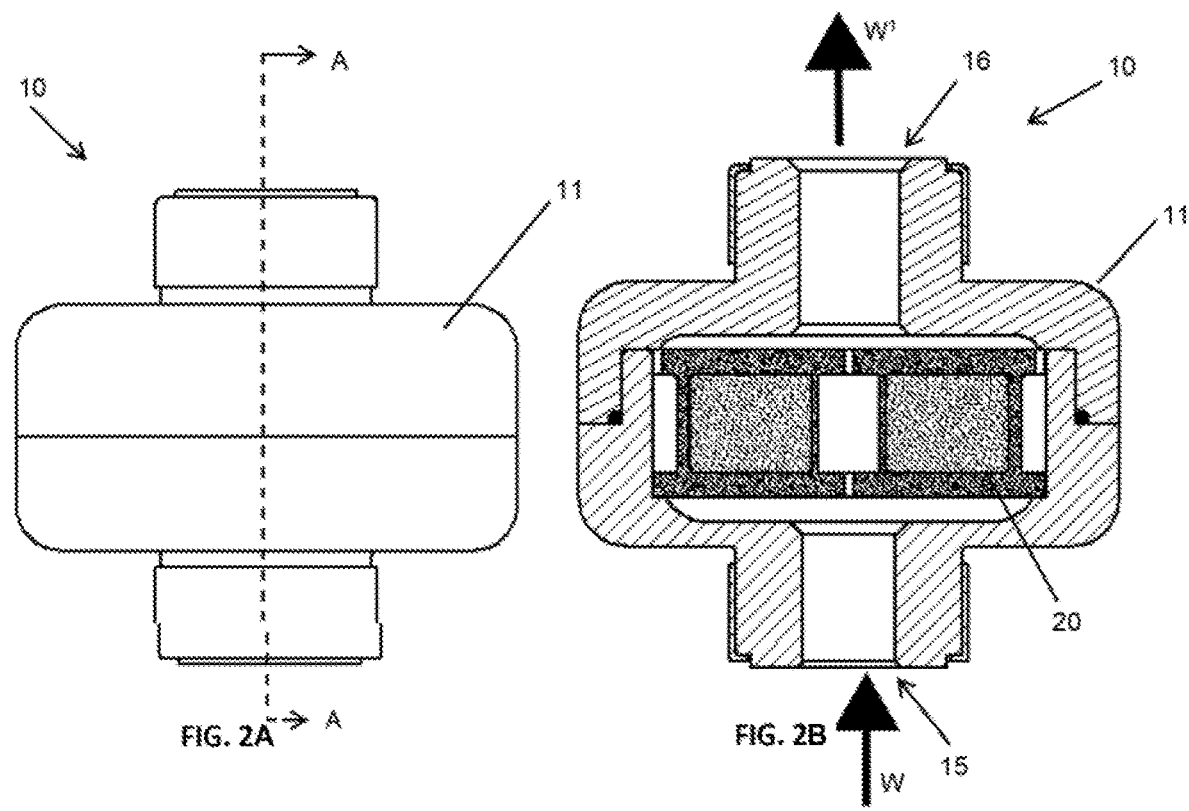
FIG. 2A is a side view of the scale reduction cartridge system of FIG. 1.
FIG. 2B is a cut-away side view of the scale reduction cartridge system of FIG. 2A.
Figure 2C:
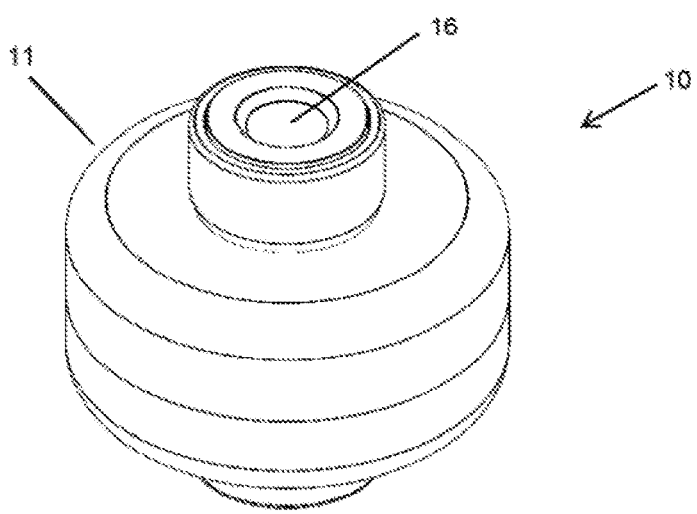
FIG. 2C is an isometric top view of the scale reduction cartridge system of FIG. 1.
Figures 3A, 3B:
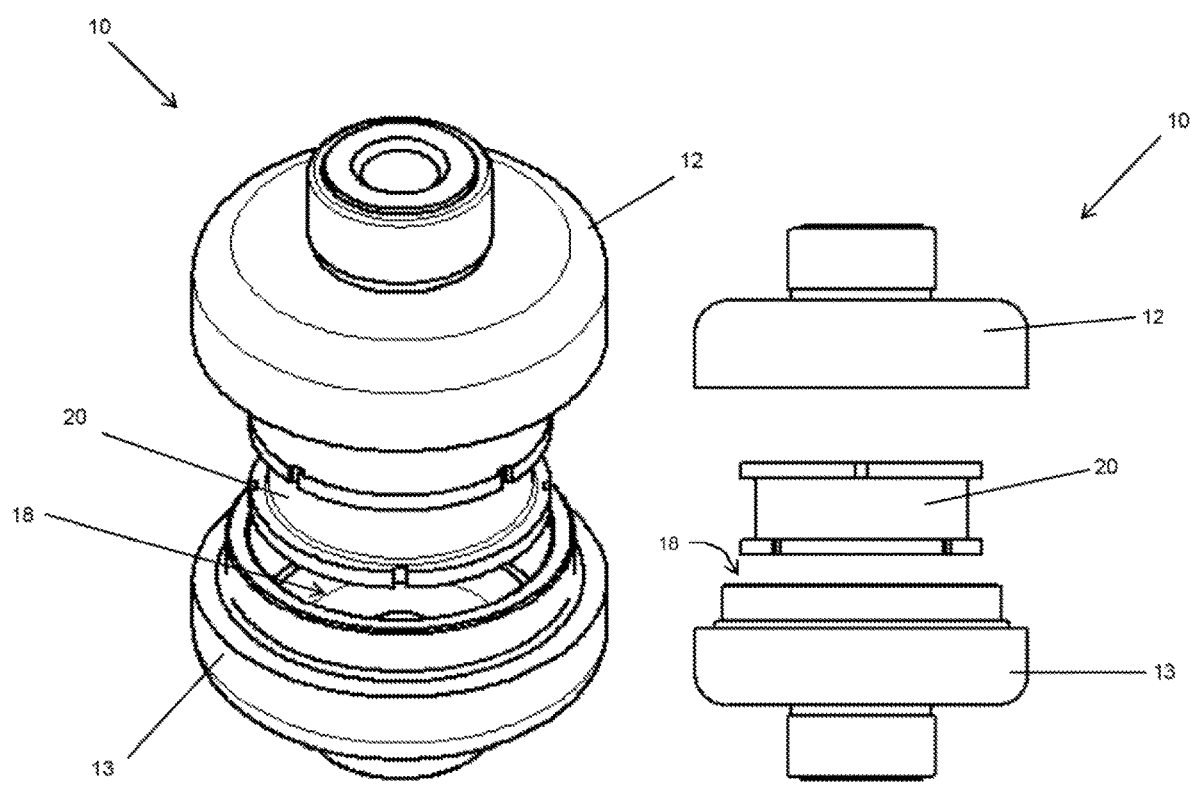
FIGS. 3A-3D are exploded side views of the scale reduction cartridge system of FIG. 1.
Figure 3C:
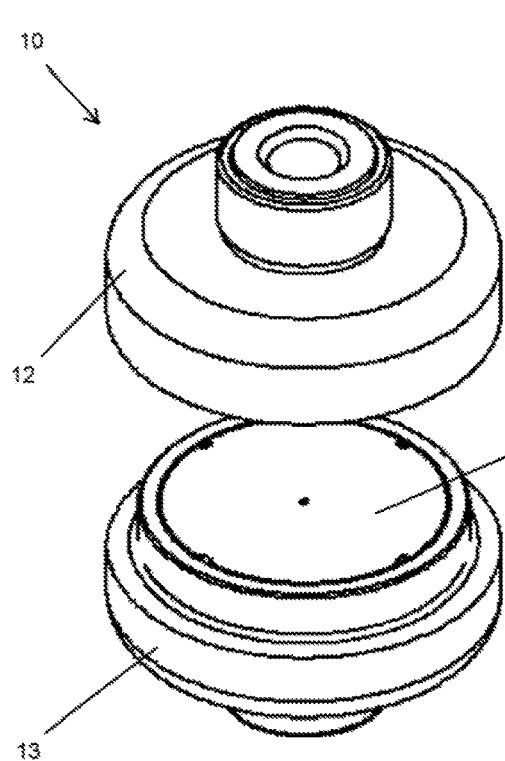
Figure 3D:
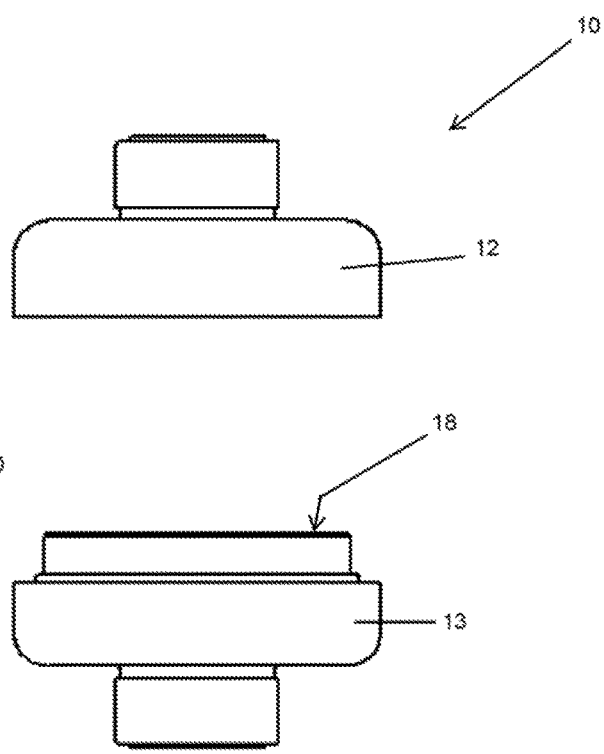

The scale reduction system 10 may include a housing 11 and a cartridge 20 therein. The housing 11 may be manufactured from numerous materials, including metals, composites, and/or ceramics. For example, housing 11 may be made from Titanium. As illustrated in FIGS. 2A-2C, the cartridge 20 may be symmetrical and is modular so that it may be removed and replaced from the housing 11, and that symmetry facilitates replacement in the field; however, the cartridge 20 may be unsymmetrical in other embodiments. The housing 11 defines the outer dimensions and geometry of the scale reduction system 10. As will be appreciated, the scale reduction system 10 may have various configurations. In some embodiments, the scale reduction system 10 utilizes an in-line housing design (FIGS. 1-3, 5), whereas in other embodiments it is configured with a point-of-use (aka horizontal flow) design (e.g., FIGS. 6a-b). Embodiments of scale reduction systems utilizing the in-line and point of use configurations are disclosed below.

FIGS. 2A-2C depict the scale reduction system 10 having an in-line configuration. As illustrated, the scale reduction system 10 includes a housing 11 with an inlet 15 and an outlet 16. In application, the inlet 15 is connected to the fluid source (not illustrated) and receives an untreated fluid flow W, whereas the outlet 16 delivers a treated fluid flow W' to and through, for example, the inlet 3 of an airplane lavatory, galley hot water tank such as tank 1, or other equipment that is connected thereto. The fluid source to which inlet 15 is connected will typically provide a continuous fluid flow that is only stopped or interrupted by engaging the equipment connected to outlet 16, such as tank 1.

Housing 11 has an inner compartment or recess 18 that is configured to receive a cartridge, insert, or module therein. The housing recess 18 is best illustrated in FIGS. 3A-3D, which depict the example scale reduction system 10 comprising a two-part housing 11 and an inner module or cartridge designed to fit within the housing 11. The dimensions of the recess 18 may depend on the module (discussed below) inserted therein. For example, recess 18 may be appropriately sized so that a porous scale-reduction module fits securely and snuggly therein.

With reference to FIGS. 3A-D, various exploded views of the scale reduction system 10 are illustrated wherein the housing 11 is a two-part housing having a first part 12 and a second part 13. In this embodiment, the first part 12 and the second part 13 of the housing 11 have corresponding mating portions that are held together as shown in FIG. 2. In one embodiment, these corresponding mating portions are tapped with corresponding threads such that they may be screwed together. It will be appreciated, however, that other methods may be utilized to join first part 12 and second part 13 such as, for example, adhesives, welding, frictional engagements, etc. And, in some embodiments, a sealing element or gasket, such as an O-ring, is disposed between the first part 12 and the second part 13 of the housing 11 to ensure no leakage and/or pressure loss there through. The foregoing two-part housing 11 design facilitates field maintenance and other repair or part replacement required of the scale reduction system 10, such as replacing or replenishing the chemical solution therein, thereby making the scale reduction system 10 a re-usable product rather than a single use product. It will be appreciated, however; that the housing 11 may be differently configured in other embodiments so that, for example, it includes differently arranged first and second parts and/or is not a "two-part" housing.

FIGS. 4A-4F depict various representations of the cartridge 20, according to one or more embodiments. The cartridge may be modular and may thus be removed and replaced from the housing 11 as needed. Here, the cartridge 20 comprises a first porous plate 22, a second porous plate 24, and a porous sidewall 26. In this embodiment, the first and second porous plates 22,24 are circular, and the porous sidewall 26 is configured as a cylindrical/tubular structure disposed between and interconnecting the first and second porous plates 22,24 so as to define a wall extending therebetween. The width of this continuous outer wall-structure formed by sidewall 26 is defined by the distance between the first and second porous plates 22,24. It will be understood that the first and second porous plates 22,24 and the sidewalls 26 may comprise other geometries. The cartridge 20 includes an inner cavity 28 (best shown in FIGS. 4E and 4F) that is designed to hold a chemical composition 30. The cartridge 20 is manufactured by bonding, welding, or pressing the first and second porous plates 22,24 and the sidewall 26 together. Once assembled, the cartridge 20 will have a first surface 23, a second surface 25, and a sidewall surface 27. The symmetrical design of cartridge 20 allows fluid to uniformly enter and exit the cartridge 20 without any special mounting configuration or orientation within the housing 11. Moreover, this induces the fluid to flow into and through the cartridge 20 in a direction that is generally orthogonal to the surface of the cartridge 20 through which it flows. Thus, fluid flowing through the porous first plate 22 will flow in a direction that is generally perpendicular to the porous first plate's surface 23.

The inner cavity 28 of the cartridge 20 is filled with the chemical composition 30 that is to be mixed, in a controlled manner, with the untreated fluid W flowing through the scale reduction system 10 into, for example, the water tank 1. Suitable chemical compositions include any number of commercially available water softening agents of Eagle® sorb ES3 Anti-Scale and/or SCALENET™; however, it will be appreciated that other water softening agents may instead be utilized. It will also be appreciated that, in addition to or in lieu of these water softening agents, other types of chemical compositions 30 may be utilized within the cartridge 20 to impart other desired properties to the fluid flow entering the tank 1. In addition, the chemical composition 30 may be provided in many different forms, for example, as a powdered media, a substantially solid mass, a viscous liquid, a multitude of beads or other elements, etc. In the example illustrated in FIGS. 4a-4f, the chemical composition 30 is a puck shaped solid mass that is appropriately dimensioned to fit within the cavity 28. In another embodiment, the chemical composition 30 is configured in the shape of minute beads and/or configured as a multitude of micro balloons, either of which would reduce density while increasing contact area for improved contact of the water being treated.

As their names suggest, the porous first plate 22, the porous second plate 24, and the porous sidewall 26 are all porous and, therefore, made from porous materials, such as a porous plastic tubes and fluidizing plates made by GenPore®. Other suitable materials, by way of example, include ultra-high molecular weight (UHMW) Polyethylene, Polyethylene co-polymers, or Polypropylene. The porous first plate 22 has a first porosity P1, the porous second plate 24 has a second porosity P2, and the porous sidewall 26 has a third porosity P3. In one exemplary embodiment, P1 is a 50 micron pore size, whereas P2 and P3 are both a 100 micron pore size. One skilled in the art will recognize that utilization of other pore size values for P1, P2, and P3 may be advantageous in other applications due to different pressure drops utilized and, moreover, that the porosities P1, P2,P3 need not be equal. Generally speaking, porosity is the measure of empty spaces (i.e., the measure of the volume of the voids) and, therefore, a given porosity is characterized by the number and size of pores in a unit area. The different porosities allow the untreated fluid flow W to flow through and thoroughly mix with the chemical composition 30 at different flow rates, thereby promoting chemical composition to saturate the untreated fluid flow W and then exit the scale reduction system 10 as a treated flow W' at a controlled or metered release rate. In addition, designing cartridge 20 as disclosed herein with the porous materials prevents it from cracking or fracturing if the fluid therein freezes. This enables an aircraft to be exposed to colder temperatures without damage, such as when an aircraft is parked on the tar-mac overnight.

When the cartridge 20 is inserted in the recess 18, various compartments or flow chambers are formed or defined between the exterior of cartridge 20 and the inner surface of housing recess 18. In one embodiment, these compartments or flow chambers include (i) a first chamber 32, which is defined as the area between the exposed inner surface of the recess 18 and the first surface 23 of the cartridge 20, (ii) a second chamber 34, which is defined as the area between the exposed inner surface of the recess 18 and the second surface 25 of the cartridge 20, and (iii) a third chamber 36, which is defined as the area between the exposed inner surface of the recess 18 and the sidewall surface 27 of the cartridge 20.

Figure 5A:
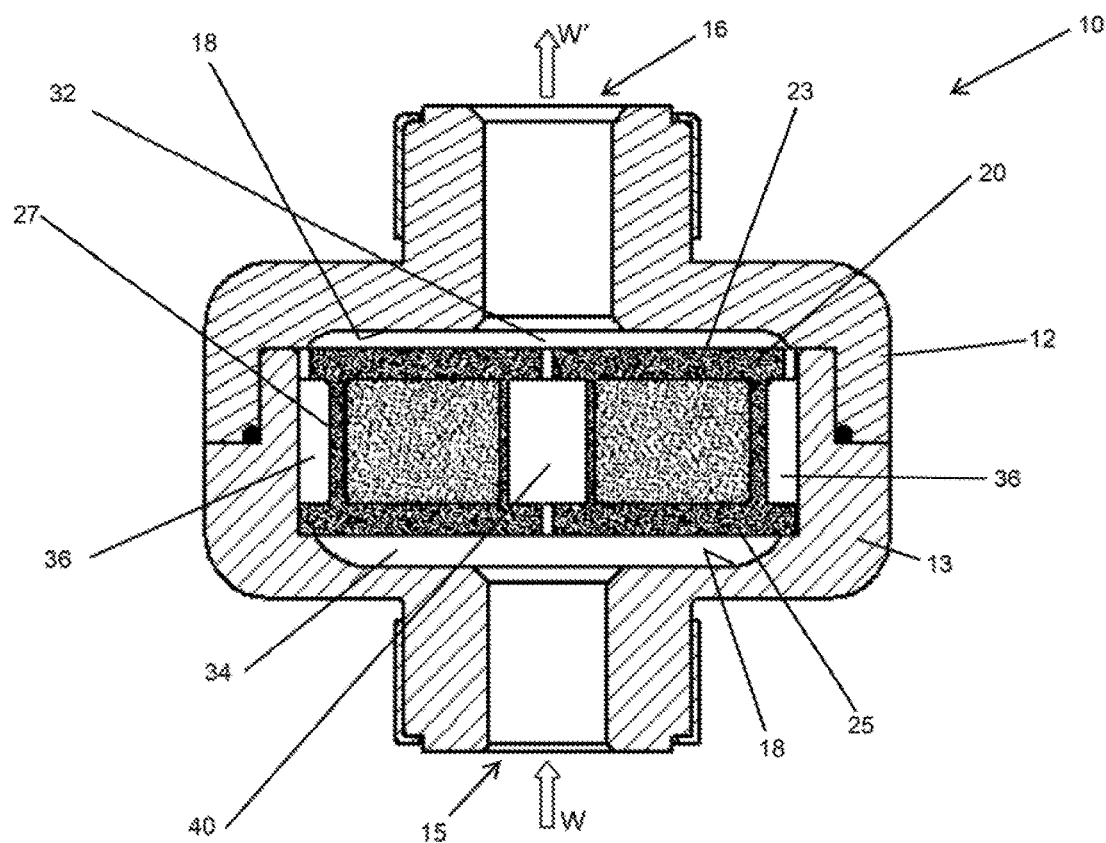
FIG. 5A is a cut-away side view of the scale reduction cartridge system of FIG. 1.

The compartments or flow chambers 32, 34, and 36 are best shown in FIG. 5A. As depicted, the first chamber 32 is formed between the exposed inner surface of the recess 18 and the first surface 23 of the cartridge 20. Similarly, the second chamber 34 is formed between the exposed inner surface of the recess 18 and the second surface 25 of the cartridge 20. Further, the third chamber 36 that encircles the perimeter of cartridge 20 is formed between the exposed side surfaces of the recess 18 and the sidewall surface 27 of the cartridge 20. In this embodiment, the third chamber 36 is formed as an annular or ring-shaped channel that surrounds the cartridge 20. The chambers 32,34,36 are passageways that permit fluid to flow around, into, and out of the cartridge 20 as depicted by the arrows in FIG. 5B. One skilled in the art will recognize that the illustrated configuration of flow chambers may be optimized for other applications by utilizing different geometries.

FIG. 5A is a cross-section view of the scale reduction system 10 along the axis A-A of FIG. 2A and depicts the untreated fluid flow W entering inlet 15 and the treated fluid flow W' exiting the outlet 16. In use, the inlet 15 will be connected to a continuous source of fluid pressure (e.g., a pipe or other piece of equipment providing source water), whereas the outlet 16 will be connected to equipment through which outlet fluid flow W' is not continuous (i.e. the aircraft potable water equipment will not always be dispensing treated water and, therefore, the fluid flow of W' through 16 is not continuous). Therefore, the input untreated fluid flow W will continuously exert pressure at the inlet 15 of the scale reduction system 10 even when idle, and this constant fluid pressure exerted by the inlet untreated flow W ensures that the recess 18 is always filled with fluid, including all compartments such as the flow chambers 32,34,36 therein. For example, the continuous flow into the scale reduction system 10 and into the porous cartridge 20 therein creates a "fluid bed" for the chemical composition 30, which in turn facilitates the chemical mixing of the chemical composition with the untreated fluid W. As will be appreciated, the "fluid bed" is created by the flow chambers 32,34,36 that allow the untreated fluid flow W from the inlet 15 to continuously surround the cartridge 20 and flood the cavity 28 therein (i.e., when the system 10 is both active and idle).

Figure 5B:
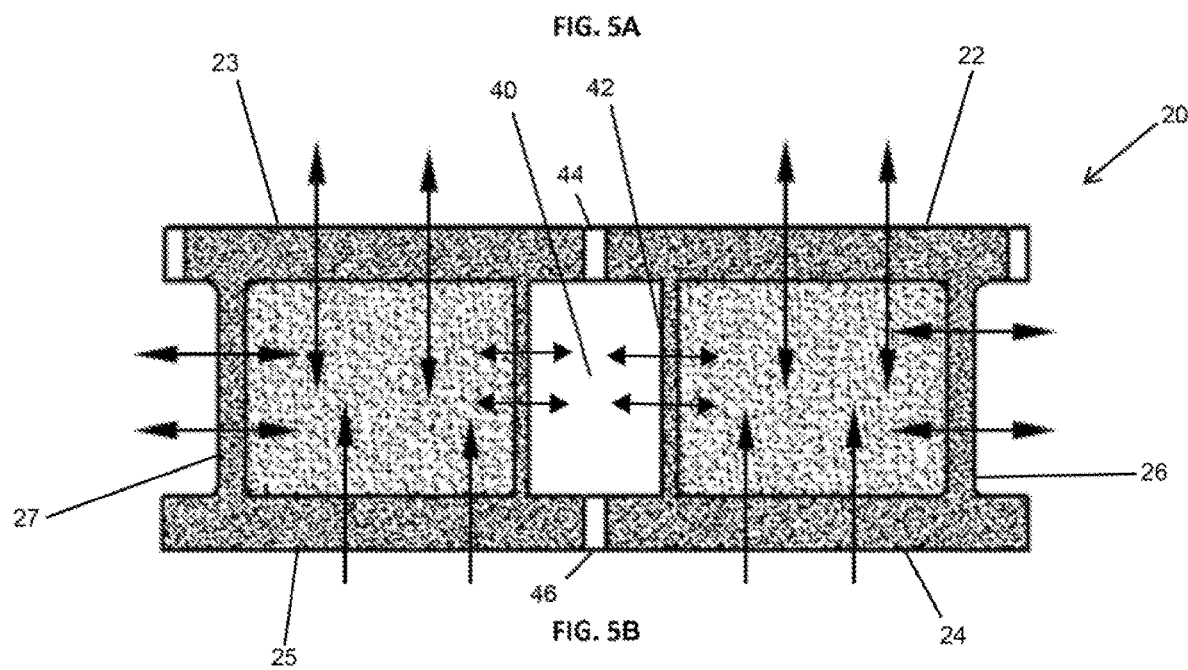

FIG. 5B depicts an exemplary porous cartridge 20 and the manner in which fluid may flow into and out of its interior compartment. In some embodiments, the cartridge 20 optionally includes a central flow cavity 40 formed or defined by a central wall 42 of the cartridge 20. As depicted by the arrows in FIG. 5B, fluid enters cartridge 20 through the porous first and second plates 22,24 and the porous sidewall 26 (as well as via the walls 42, if utilized). The porous materials utilized to construct cartridge 20 are selected with a certain porosity and oriented so that the untreated fluid flow W is exposed to the chemical composition 30 at a metered rate. Different applications will necessitate the untreated flow W to be exposed to the chemical composition 30 at different rates and for different amounts of time to ensure adequate mixing. Moreover, different applications will necessitate different pressure drops from inlet 15 to outlet 16. The geometry and porosities of the cartridge 20 may be optimized for a particular application. Thus, the chemical composition 30 within cartridge 20 is continuously immersed and saturated by at least some of the untreated inlet flow W regardless of whether the system is idle or whether there is treated flow W' exiting the system through outlet 16. This constant immersion of the chemical composition 30 ensures that all treated flow W' exiting the scale reduction system 10 is sufficiently treated and saturated with the desired amount of the chemical composition 30. This feature ensures that even the leading volume of treated output flow W' flowing out of the outlet 16 and into, for example, the hot water tank inlet 3 immediately upon activation by a user, is sufficiently treated with the chemical composition 30 and that no flow entering the potable water equipment is untreated.

Figure 5C:
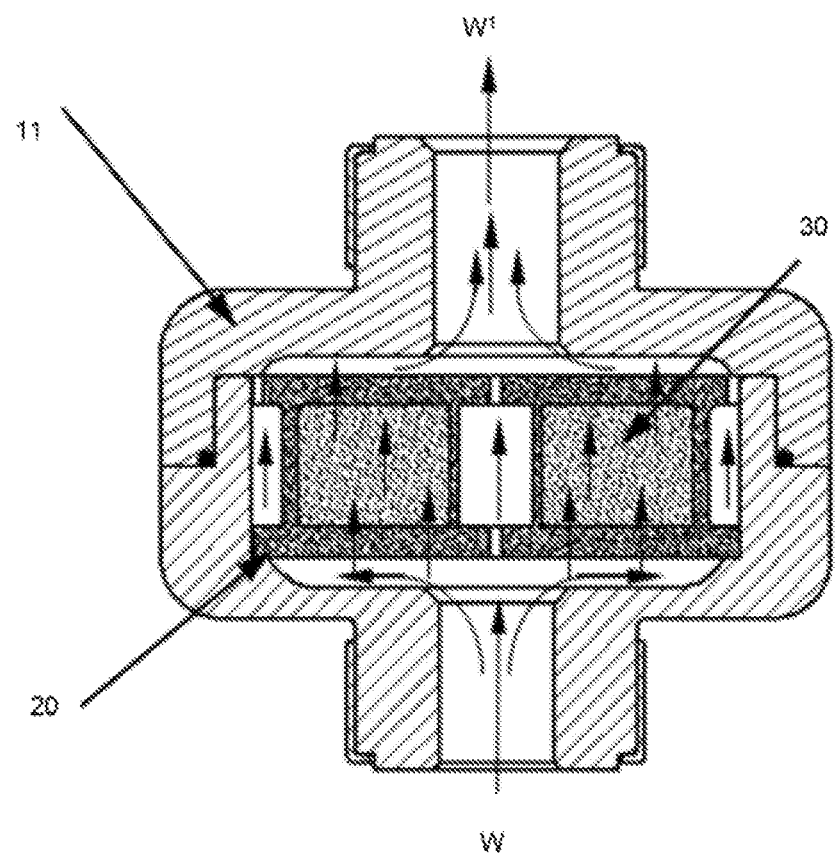

FIG. 5C generally depicts the manner in which fluid flows through scale reduction system 10 with an exemplary porous cartridge 20 installed therein. More specifically, FIG. 5*c* depicts the scenario where a user has activated/engaged a piece of equipment that is connected to the scale reduction system's outlet 16 (e.g., tank 1), which results in fluid flowing through the scale reduction system 10. As mentioned above, the housing recess 18 and the cartridge cavity 28 are always filled with fluid, even when the system is idle (i.e., no flow through the outlet 16); however, initiating fluid flow through the scale reduction system 10 by activating the aircraft's potable water equipment attached thereto causes the chemical composition 30 to mix with the untreated inlet flow W so that the treated output flow W' is sufficiently saturated with the chemical composition 30. Moreover, because the scale reduction system 10 is constantly filled with idle fluid that is exposed to the chemical composition 30 even when there is no flow there through, the initial volume of the treated flow W' exiting the outlet 16 upon activation comprises a dilute concentration of the chemical composition 30. It will be appreciated that constant immersion of the chemical composition 30 ensures that all treated output flow W' entering equipment (such as tank 1) is sufficiently treated to counteract conditions such as scale build up or other conditions for which the scale reduction system 10 has been designed to counteract.

In the illustrated embodiments, fluid flows through the scale reduction system 10 in a turbulent manner, which causes the chemical composition 30 to mix with the untreated input flow W. This mixing action ensures that the treated outlet flow W' comprises a dilute concentration of the chemical composition 30. Moreover, this mixing action can be enhanced or reduced by adjusting the pressure drop within the scale reduction system 10, which in turn affects the flow's turbulence and, ultimately, the concentration level of the chemical composition 30 within the treated output flow W'. This mixing action may be further affected by the orientation and geometries of the flow chambers 32,34,36. One skilled in the art will therefore appreciate that he or she may optimize concentration of the chemical composition 30 in the treated output flow W' by increasing or decreasing the turbulence occurring within the scale reduction system 10, and that turbulence may be affected by a number of design considerations.

As mentioned above, several optional design modifications to the scale reduction system 10 may be implemented that affect the turbulence encountered therein and, consequently, the concentration of the treated output flow W'. For example, the porous first plate 22 and/or the porous second plate 24 may be configured with either or both of a plurality of radial slots 22',24', respectively. If utilized, radial slots 22' will be located along perimeter of the porous first plate 22, whereas the radial slots 24' will be disposed along the perimeter of the porous second plate 24. In one exemplary embodiment, only one of the radial slots 22',24' are utilized, whereas in other embodiments both the radial slots 22',24' are utilized. Where both the radial slots 22',24' are utilized, they may either be aligned with each other or off-set (i.e., not in alignment) from each other as illustrated in FIGS. 4A-4F. In use, the radial slots 22',24' permit increased flow through the system, and if staggered as depicted, may result in increased turbulence that increases the mixing capabilities as well as the concentration of the chemical composition 30 in the treated outlet flow W'. It should be noted, however, that the radial slots 22',24' are optional and not utilized in every embodiment, but in other embodiments the radial slots 22',24' are differently configured from what is illustrated.

Figure 4A:
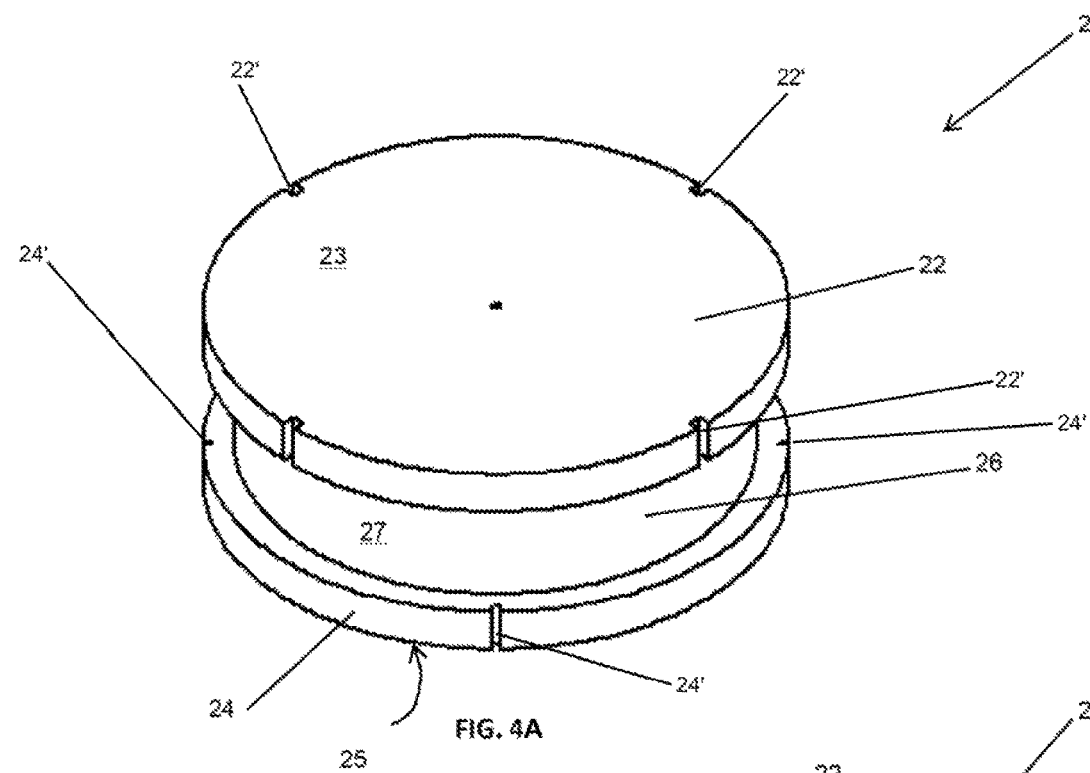
FIGS. 4A-4F are various side views of an exemplary cartridge that may be utilized with the scale reduction cartridge system of FIG. 1.
Figure 4B:
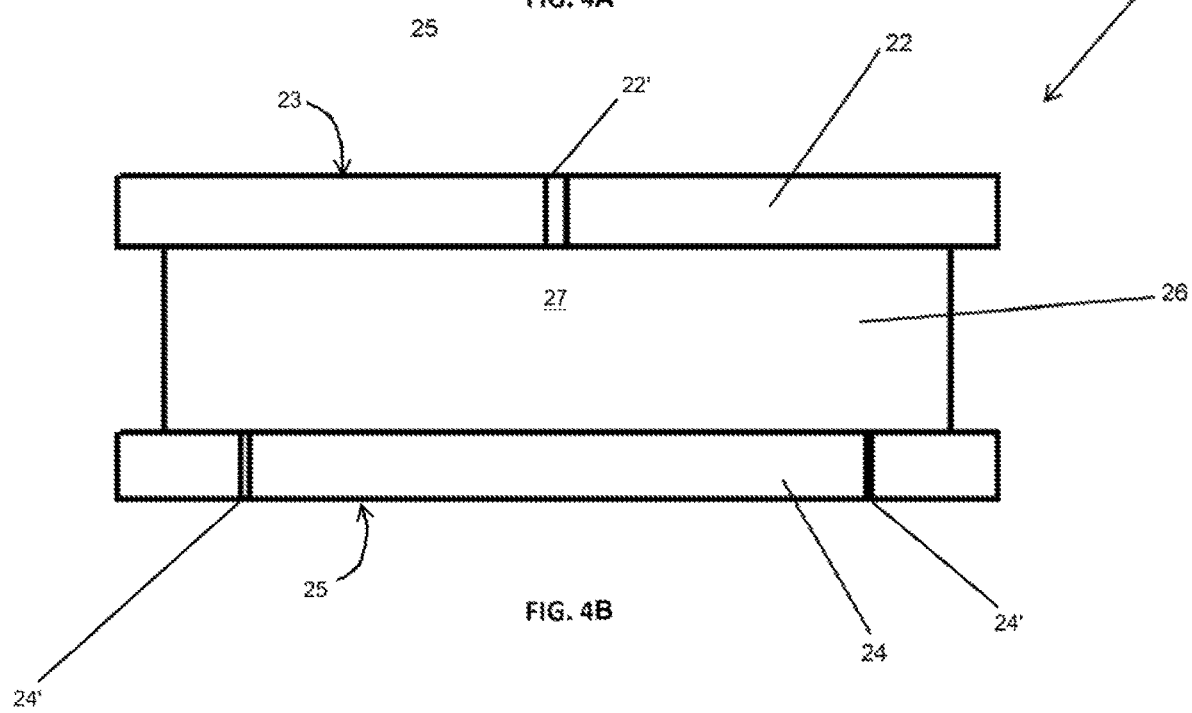
Figure 4C:
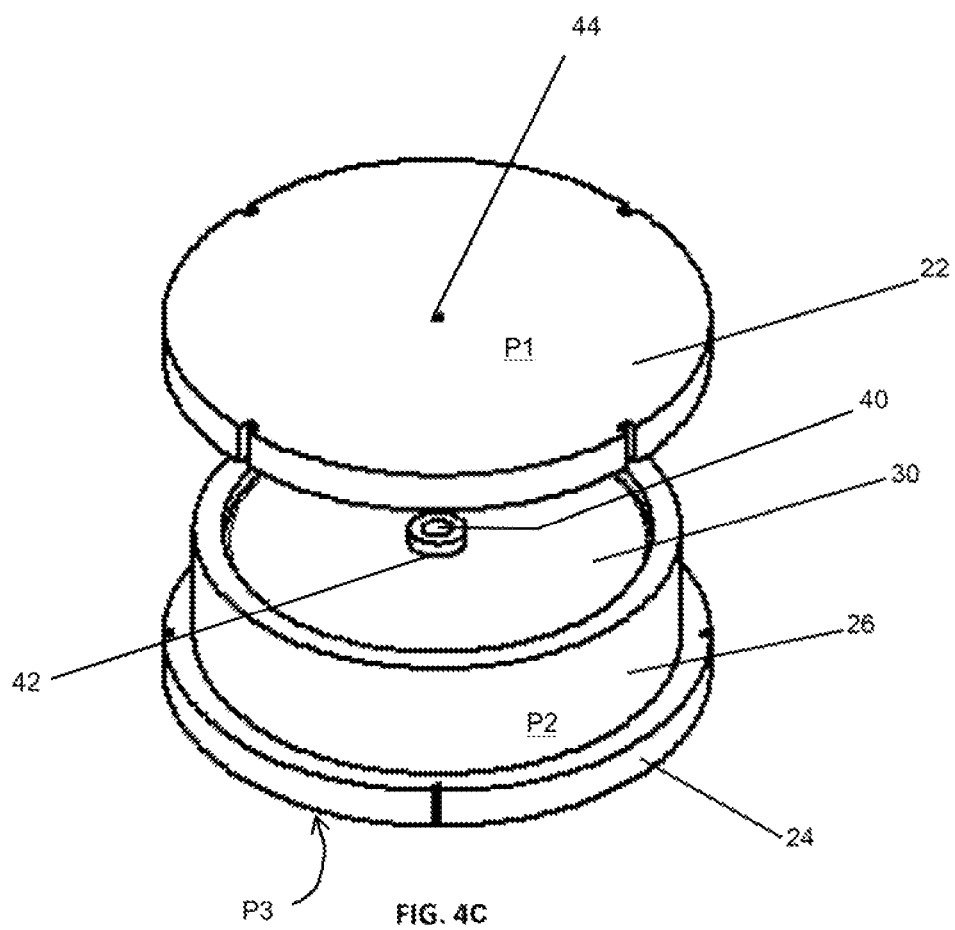
Figure 4D:
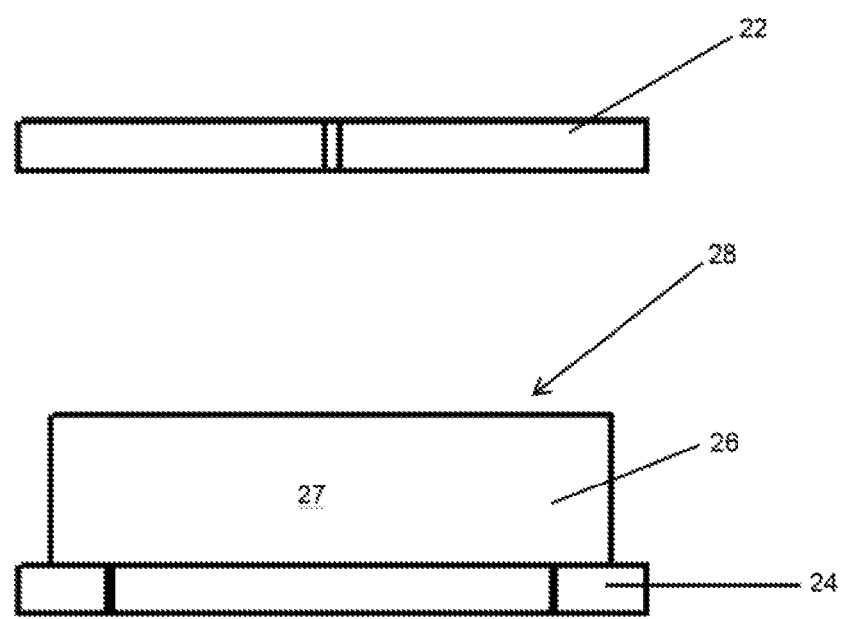
Figure 4E:
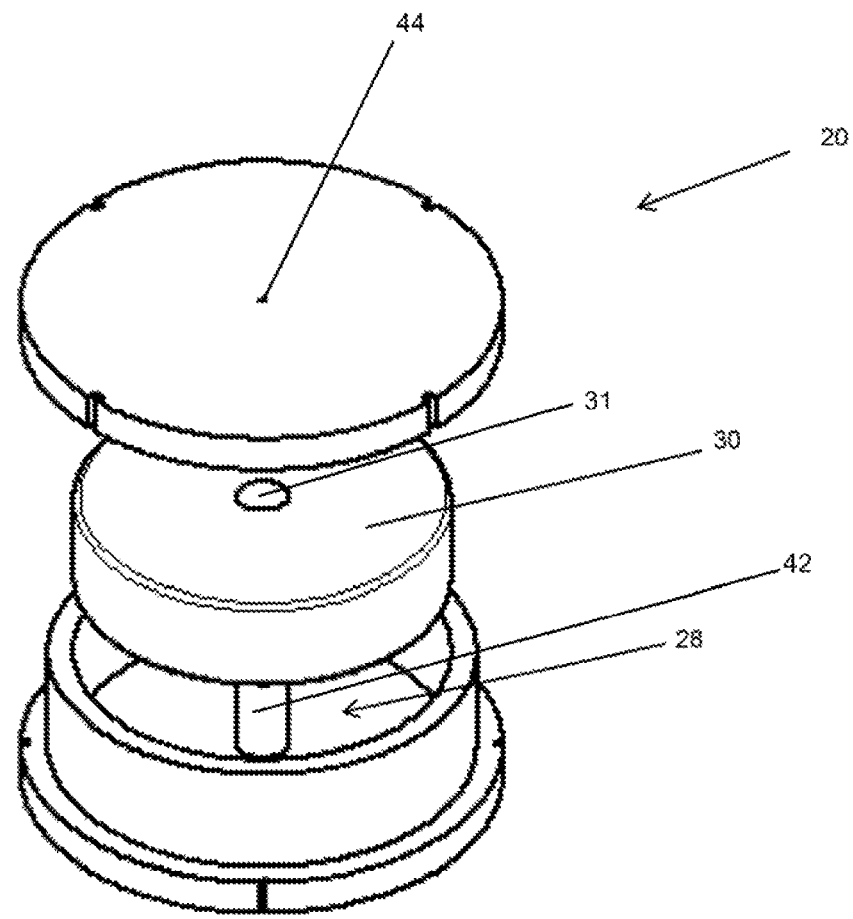
Figure 4F:
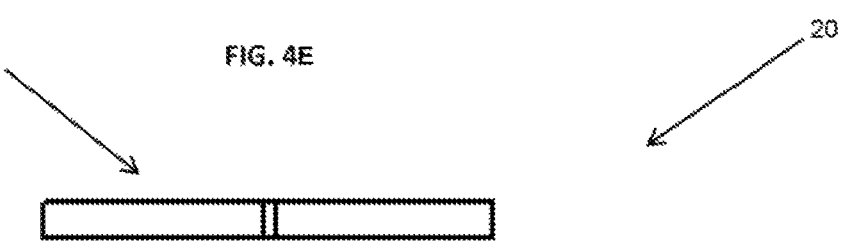
Figure 4F:
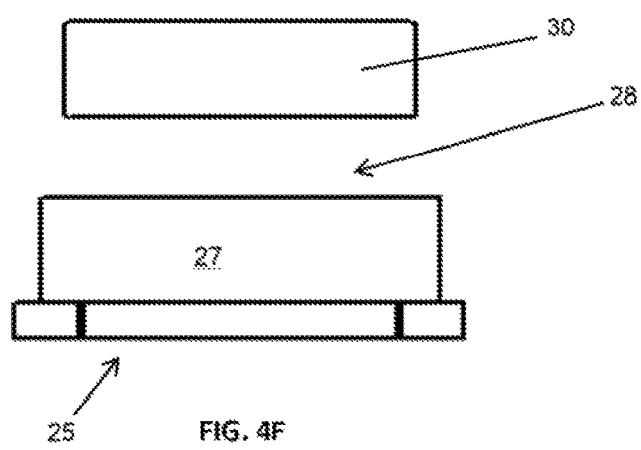

FIGS. 4A-4F illustrates a second optional feature that affects the pressure drop and the concentration of the chemical composition 30 in the treated output flow W'. The inner cavity 28 of the cartridge 20 may be annular shaped with a central cavity 40 as best illustrated in FIGS. 4C and 4E. Here, the central cavity 40 includes a central cavity side walls 28, and the central cavity 40 provides an avenue for fluid to access inner cavity 28, for example, through the central cavity side walls 28. As depicted, the chemical composition 30 may have a central void 31 into which the central cavity 40 is received so that the central cavity sidewalls 42 abut the bore of the central void 31. Where utilized, the central cavity sidewalls 42 may be constructed from the same porous material used to construct first plate 22, the second plate 24, and the sidewall 26. Moreover, the inner cavity sidewalls 42 may have any number of porosities. For example, sidewalls 42 may have the porosity P1, P2, P3, or even a fourth porosity, P4. The fluid flow may access the central cavity 40 via the pores on the porous first plate 22 and porous second plate 24. To increase flow in and through the central cavity 40, the first plate 22 and/or the second plate 24 may include a first and second flow aperture 44,46, respectively. The illustrated embodiment depicts the flow apertures 44,46 on the first surface 23 and the second surface 25, respectively.

Another manner in which to vary the pressure drop and, therefore, to adjust the concentration of the chemical composition 30 in untreated output flow W' is to vary the porosities P1, P2, P3, and P4. Varying these porosities may affect the rate by at fluid flows into and through the cartridge 20 and mixes with the chemical composition 30, and may each be varied to obtain the desired concentration of the chemical composition 30 in the treated fluid flow W' flowing from the outlet 16. Having differing porosities (i.e., different pore sizes) allows fluid to pass through and mix with the chemical composition 30 at different rates resulting in turbulence, thus promoting the media being released at a metered rate.

The manner in which fluid flows into and through the in-line scale reduction system 10 is best depicted in FIGS. 5A-5C. In operation, the untreated input flow W enters the scale reduction system 10 at the inlet 15 and then enters the second chamber 34. From the second chamber 34, the untreated flow W enters (i) the third chamber 36 through the porous second plate 24 (and, in this embodiment, the optional radial slots 24'), (ii) the inner cavity 28 of the cartridge 20 through the porous second plate 24 so as to be exposed to the chemical composition 30, and (iii) the optional central cavity 40 of the cartridge 20 via both the porous second plate 24 and its aperture 46, if any. The flow entering the third chamber 36 (that is at least partially treated) may then flow back into inner cavity 28 through porous sidewall 26 and/or flow into the first chamber 32 via the porous first plate 22 and, in this embodiment, the optional radial slots 22'. The fluid within the inner cavity 28 mixes with the chemical composition 30 to create a dilute concentration, which exits the inner cavity 28 and enters the first chamber 32 through porous first plate 22. Furthermore, the fluid flow that entered the central cavity 40 exits that central cavity 40 via the porous first plate 22 and the aperture 44. Thereafter, the fluid in the first chamber 32 exits the scale reduction system 10 as treated output flow W' via the outlet 16 and enters an aircraft's potable water system, such as the tank 1 via the inlet 3.

Figure 6A:
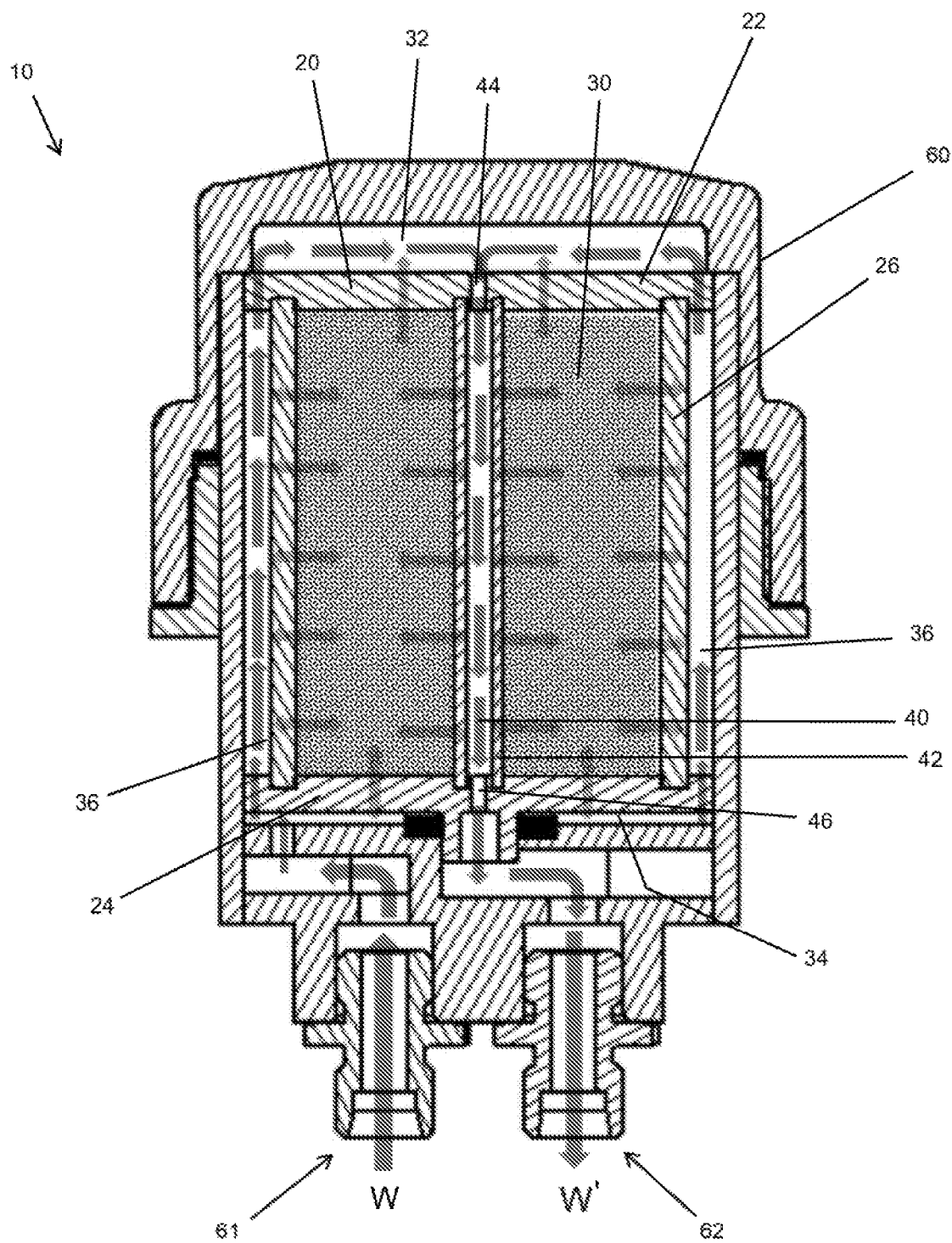
FIG. 6A-6B are cut-away side views of the scale reduction cartridge system according to another embodiment.
Figure 6B:
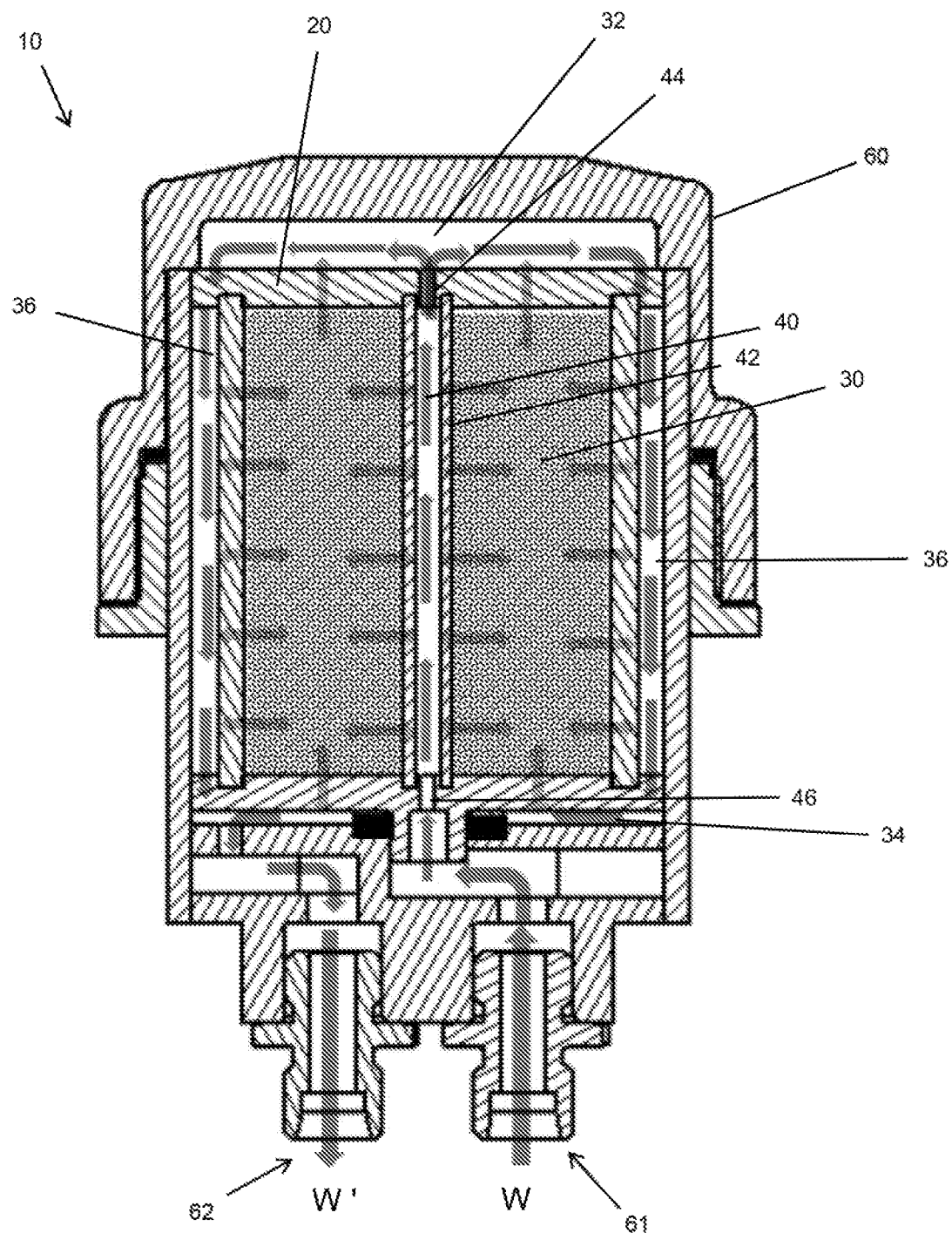

FIGS. 6A and 6B depict alternate embodiments of the scale reduction system 10 having housings 60 and 60', respectively, where both the inlet and outlet are configured on the same end, in what is referred to as a point of use or horizontal flow configuration. Both the housing 60 of FIG. 6A and the housing 60' in FIG. 6B are two-piece housings; however, both an untreated fluid inlet 61 and a treated fluid outlet 62 are provided on the same end of the system. These housing designs facilitate maintenance and replacement in the field and/or improved drainage of fluid therefrom during servicing. Note that in FIG. 6A, the fluid is first directed upwards through the cartridge's 20 porous plastic thereby creating a fluidized bed for the chemical media 30 therein. For example, in FIG. 6A the untreated fluid W is directed upwards through the inlet 61 and into the second chamber 34, where the untreated fluid W may pass into the cartridge 20 via its bottom porous plate 24. The untreated fluid W may also flow upward through the third chamber 36 that surrounds the cartridge 20, and simultaneously enter the cartridge 20 via the porous sidewalls 26, until it reaches the first chamber 32, at which point the at least partially treated fluid may then flow down through the aperture 44 in the porous plate 22 and down through the central cavity 40 (while missing with the chemical composition 30) of the cartridge 20 until it is directed out of the scale reduction system 10 via the outlet 62. It will be appreciated that chemical mixing of the fluid is facilitated by the venturi effect. The flow indicated by W and W' depicted in FIG. 6B is opposite that depicted in FIG. 6A. Thus, the only structural difference between the embodiments depicted in FIGS. 6A and 6B is that fluid inlet 61 and fluid outlet 62 are reversed, which in turn reverses the fluid flow as indicated by the arrows in FIGS. 6A and 6B. Accordingly, this embodiment of the scale reduction system 10 is reversible in that the inlet 61 may operate as the outlet 62, and vice versa, depending on how the scale reduction system 10 is installed relative to the source of water and the output of the water. Therefore, the scale reduction system 10 may be easily installed in less than ideal conditions, for example, where the maintenance crew is unable to determine which conduits to interconnect the inlet 61 and outlet 62.

Figure 7A:
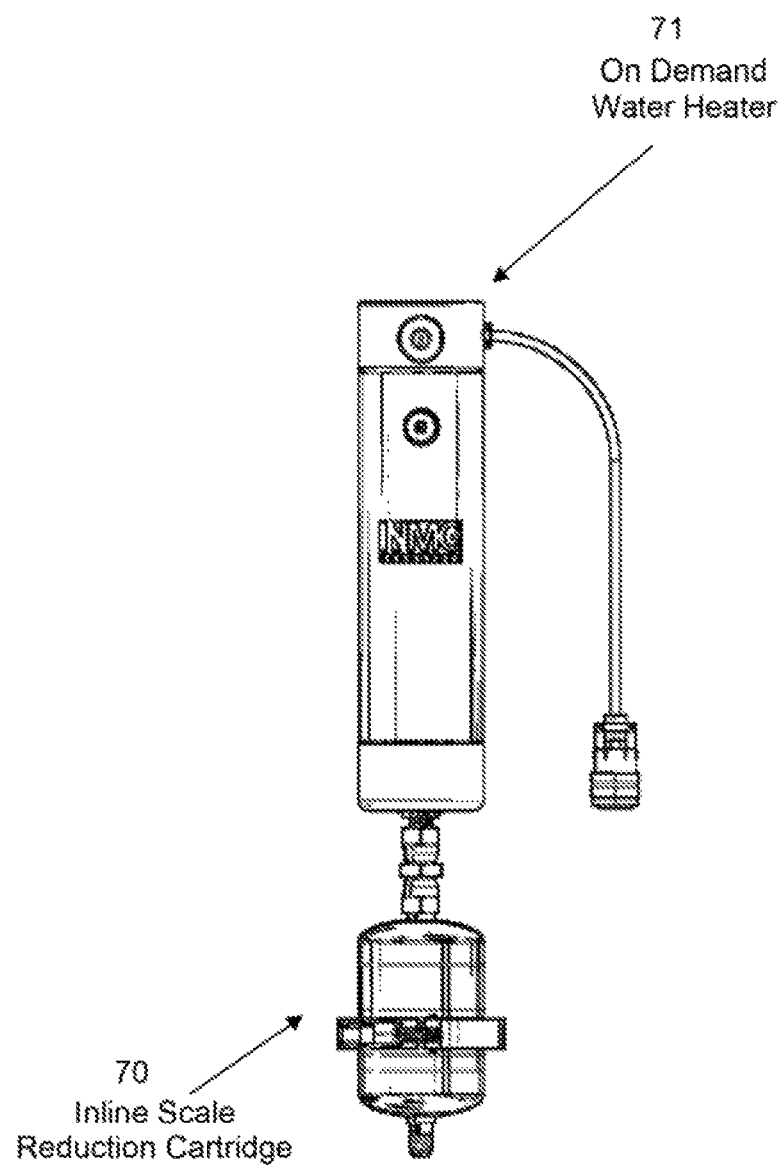
FIG. 7A is a side view of an in-line scale reduction cartridge system connected to an airplane hot water heater.
Figure 7B:
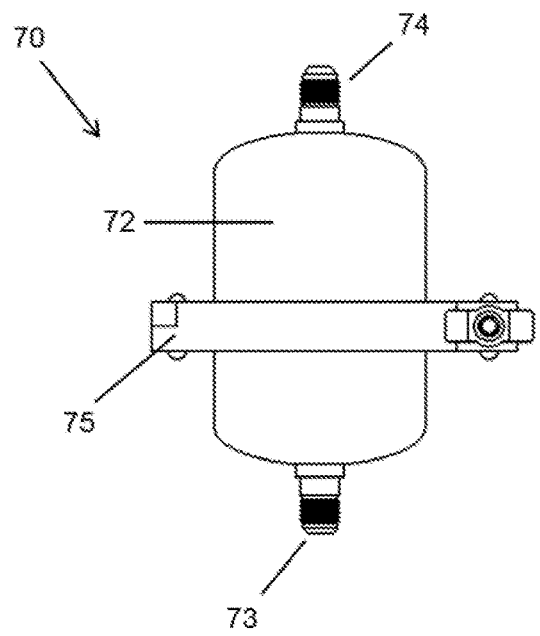
Figure 7C:
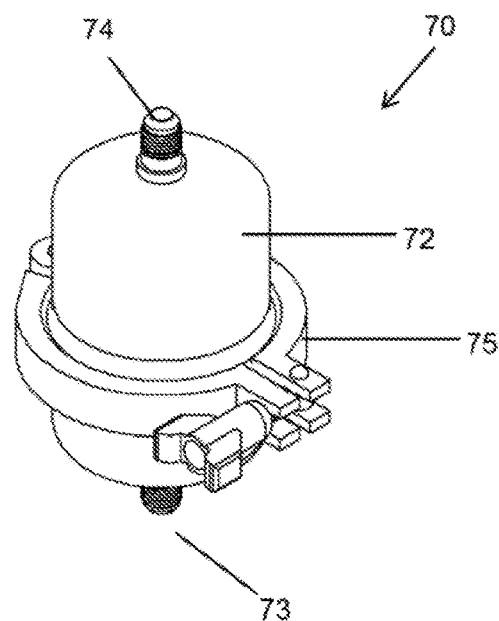
FIG. 7C is a top isometric view of the in-line scale reduction cartridge system of FIG. 7A.

FIGS. 7A-7C depict yet another embodiment of a scale reduction system. These figures depict an exemplary inline scale reduction system 70 in use with an on-demand fluid source, such as water heater 71. These figures illustrate the inline scale reduction system 70 comprising a housing 72, an inlet 73, an outlet 74, and a locking assembly 75. Here, the housing 72 is a two-part housing having a lid and a base portion, as well as a gasket disposed there between, but the housing 72 may have other configurations. The housing 72 may be manufactured from any number of materials, including stainless steel, titanium, or plastic. The locking assembly 75 may be any type of locking mechanism and, in the illustrated embodiment, is a plastic clamp.

Figure 8A:
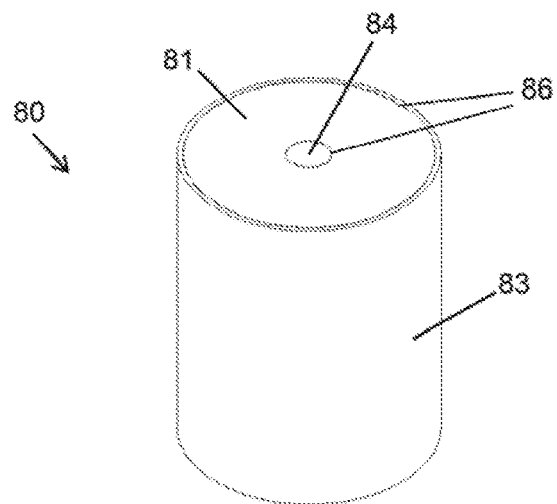
FIG. 8A is a top isometric view of the cartridge utilized in the in-line scale reduction cartridge system of FIGS. 7A through 7C.
Figure 8B:
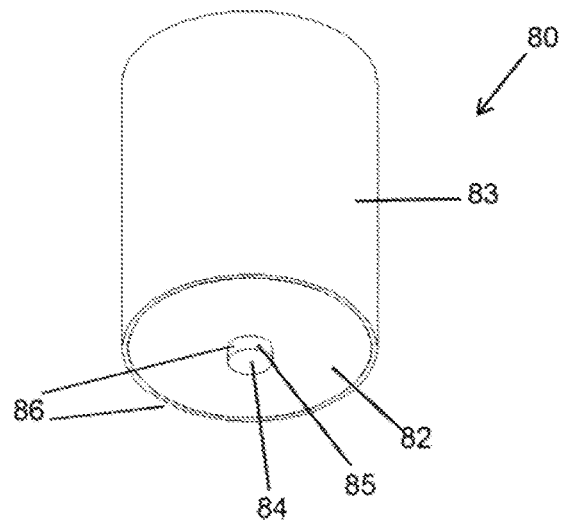
FIG. 8B is a bottom isometric view of the cartridge utilized in the in-line scale reduction cartridge system of FIGS. 7A through 7C.
Figure 8C:
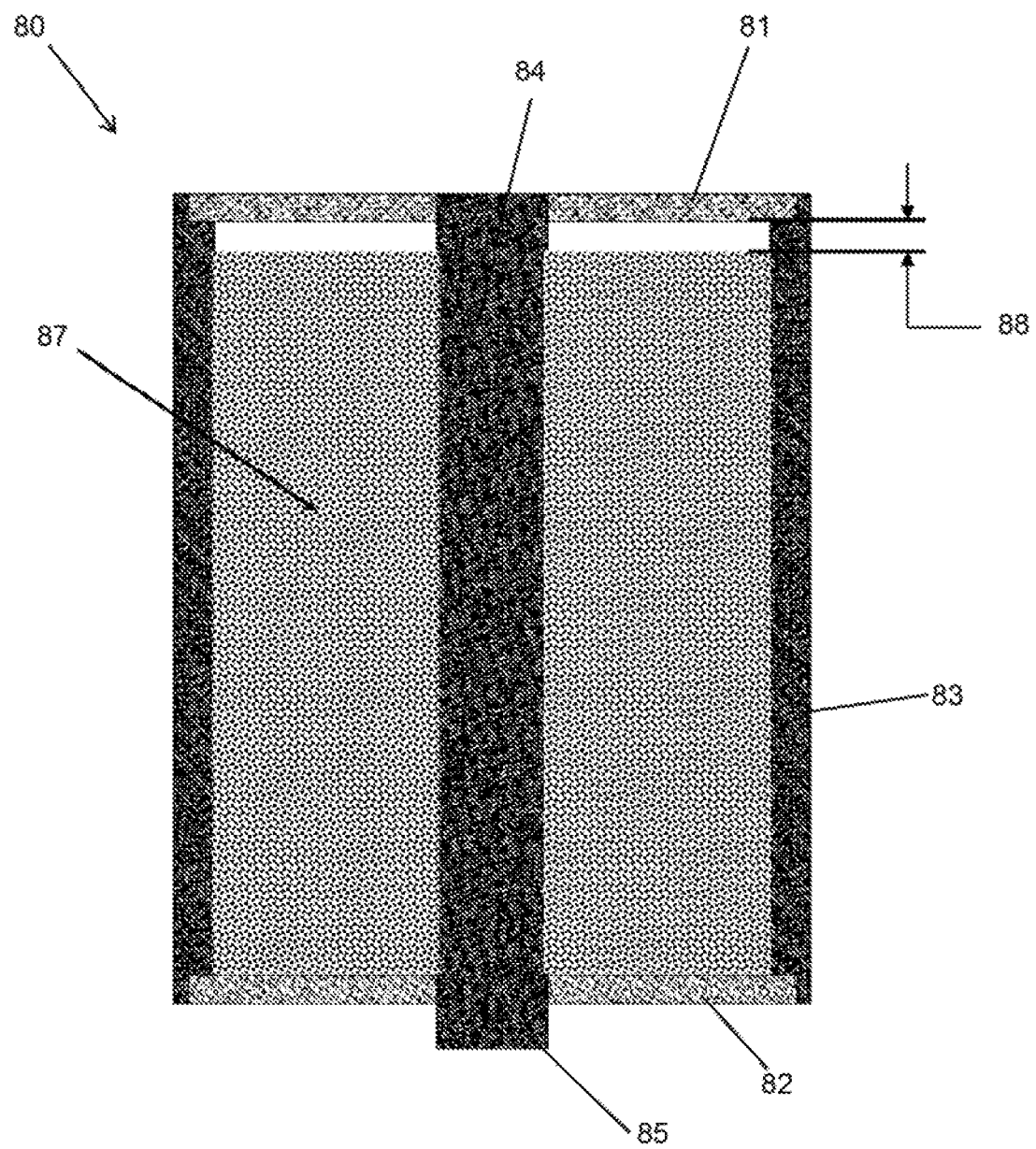
FIG. 8C is a cut away side view of the cartridge utilized in the in-line scale reduction cartridge system of FIGS. 7A through 7C.

The inline scale reduction system 70 also comprises a replaceable cartridge 80 therein. FIGS. 8A-8C illustrate the exemplary inline cartridge 80 for use with the inline scale reduction system 70. The inline cartridge 80 comprises a top plate 81, a bottom plate 82, a periphery 83 there-between, and a support member 84. Here, the support member 84 is solid, but in other embodiments it may define a central channel or conduit. In addition, the top plate 81, the bottom plate 82, the periphery 83, and the support member 84 are joined by a number of welds 86. The welds 86 may comprise any welding technique known in the art that is compatible with the cartridge material, such as, for example, polyethylene welds. Alternatively, the welds 86 may be created via utilization of a glue gun with a polyethylene glue stick.

In this embodiment, the top plate 81, the bottom plate 82, the periphery 83, and the support member 84 are all constructed from a porous, hydrophobic material. Utilization of such material permits the elements constructed thereby to perform a pre-filtration function. Further, utilization of a porous material reduces weight. In the illustrated embodiment, the porous material is porous polypropylene and, moreover, both the top plate 81 and bottom plate 82 have an average pore size of 125 microns, whereas both the periphery 83 and the support member 84 have an average pore size of 50 microns. Therefore, in this embodiment, the top plate 81 and bottom plate 82 are more porous than the periphery 83 and the support member 84. In this embodiment, the various pore sizes were selected to ensure that they are not clogged by chemical media particles housed within cartridge 80.

Also in this embodiment, the periphery 83 is a continuous cylinder that interconnects the top plate 81 and the bottom plate 82; however, it will be appreciated that other geometries may be utilized depending upon the geometry of the internal cavity within housing 72. Also, the support member 84 is solid and does not have a central channel therein as detailed above in other embodiments. Support member 84 also has a mounting stub 85 at a bottom side thereof, which protrudes from the bottom plate 82 to interact with the housing 72 when inserted therein.

The inline cartridge 80 comprises an inner cavity, which houses a chemical composition (sometimes referred to as template assisted crystallization TAC) media) 87. Chemical composition 87 is mixed with the untreated inlet fluid W, so that all fluid exiting cartridge 80 and entering equipment attached thereto (i.e., treated fluid W'), for example, water heater 71, is sufficiently treated. In one embodiment, chemical composition 87 is a water softening agent such as Eagle® sorb ES3 Anti-Scale and/or SCALENET™; however, it will be appreciated that other types of chemical compositions 87 (i.e., other than water softening agents) may be utilized within the cartridge 80 to impart other desired properties to the fluid flow entering the water heater 71. Also in this embodiment, the internal cavity of cartridge 80 is not completely filled with chemical composition 87. As illustrated, instead of being completely filled, the cartridge 80 cavity is filled with enough chemical composition 87 such that an air gap 88 is formed. In the illustrated embodiment, the cartridge 80 cavity is filled with one (1) quarter of a liter of the chemical composition 87; however, other quantities may be utilized depending on the application.

The air gap 88 may facilitate mixing of the chemical composition 87 with the fluid flowing there through. Moreover, the various porosities of the cartridge 80 may be selected such that the chemical composition 87 particles do not clog the pores of the porous material utilized to the construct cartridge 80. Regardless of the foregoing parameters and/or the dimensions of the cartridge 80, the untreated fluid W should have contact with chemical composition for a minimum amount of time to ensure adequate chemical mixing, and in the illustrated embodiment that minimum amount of time is at least five (5) seconds. Various design modifications may be implemented to ensure adequate chemical mixing, for example, of at least five (5) seconds, including (i) varying the pressure drop between the inlet 73 and the outlet 74, (ii) increasing or decreasing the surface area of the top and bottom plates and/or (iii) enlarging or decreasing pore sizes in the top and bottom plates.

Figure 9:
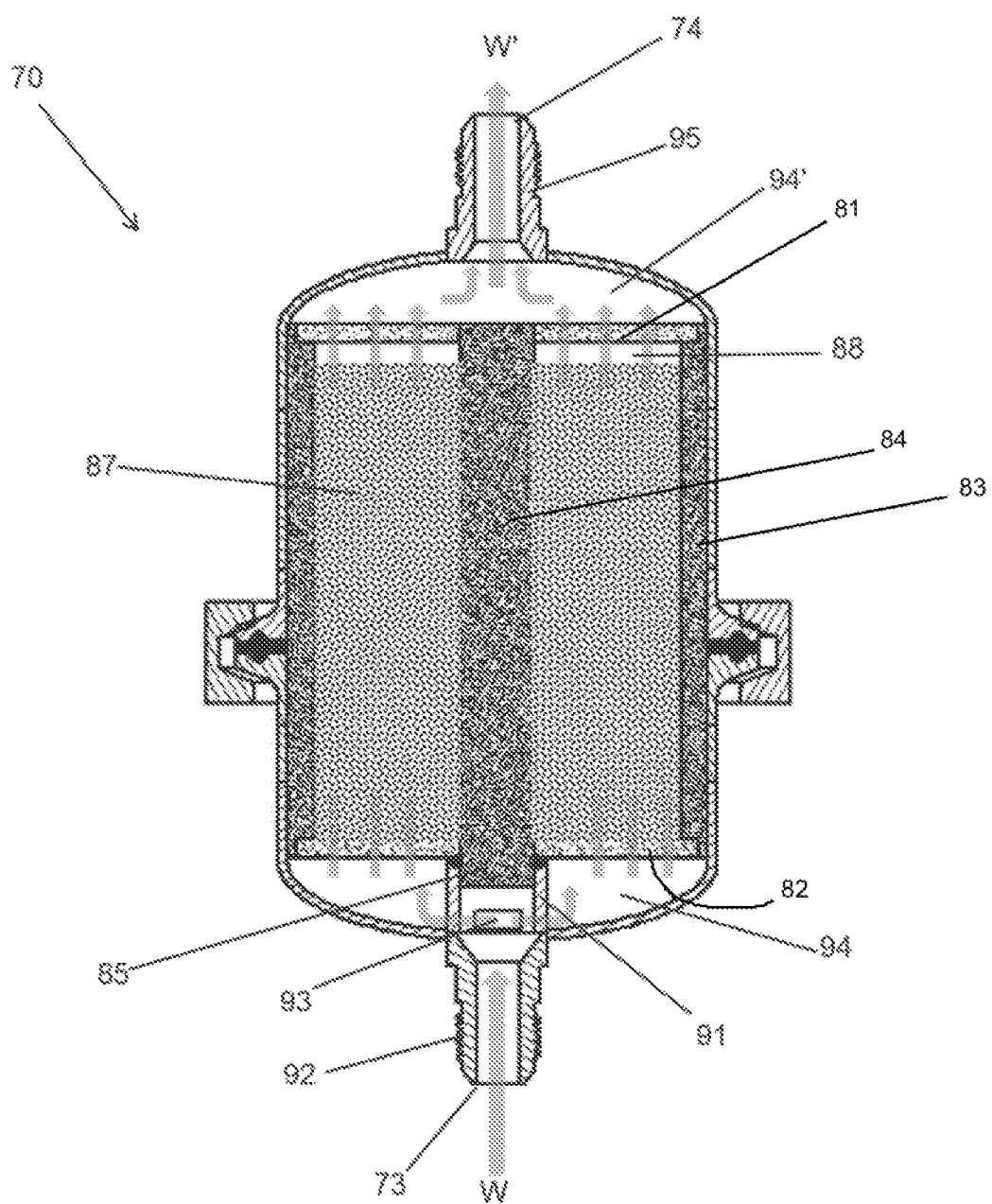
FIG. 9 is a cut away side view of the in-line scale reduction cartridge system of FIGS. 7A through 7C.

FIG. 9 illustrates the fluid flow pattern inside an embodiment of the inline scale reduction system 70. As illustrated, the stub 85 of the cartridge 80 is received by a mounting slot 91 such that the cartridge 80 is centered and secured within the housing 72, and is not displaced therefrom. Here, the mounting slot 91 is essentially defined by a first end of a cylindrical tube 92, whereas a second end of the cylindrical tube 92 defines the inlet 73. However, because the stub 85 sits in the mounting slot 91, the cylindrical tube 92 only has two (2) openings, the inlet 73 and a cylinder outlet 93, which in this embodiment is disposed along a middle portion of the cylinder 92.

In use, the untreated fluid W enters the inlet 73. From there, the untreated fluid W exits the cylinder outlet 93 and enters a bottom chamber 94 as represented by the fluid flow arrows. The untreated fluid W then passes from the bottom chamber 94 through the bottom plate 82, and enters the chemical composition 87 filled cavity of the cartridge 80. The fluid mixes with the chemical composition 87 within that cavity, and then passes through the top plate 81 of the cartridge 80, and enters the top chamber 94' as the treated fluid flow W'. The treated fluid W' then flows from the top chamber 94' into an outlet nozzle 95, and then exits the in-line scale reduction system 70 via the outlet 74. In this embodiment, the pores on the top plate 81 and the bottom plate 82 have an average pore size of 125 microns.

This pore sizing ensures that the chemical composition 87 particles do not clog the top plate 81 and bottom plate 132 pores. This pore sizing also permits the top plate 81 and the bottom plate 82 to provide post-filtration and pre-filtration functions, respectively, thereby further ensuring that none of the chemical composition 87 exits the outlet 74. Moreover, this porosity sizing ensures that the untreated fluid W mixes with the chemical composition 87 within the cavity of the cartridge 80 for at least five (5) seconds at a flow rate of one (1) gallon per minute. Here, one (1) quarter liter of the chemical composition 87 is utilized. To ensure chemical mixing for at least five (5) seconds in applications with less fluid pressure, either (i) the surface area of the top and bottom plates 81,82 should be increased or (ii) the pore size of the top and bottom plates 81,82 should be enlarged.

Figure 10A:
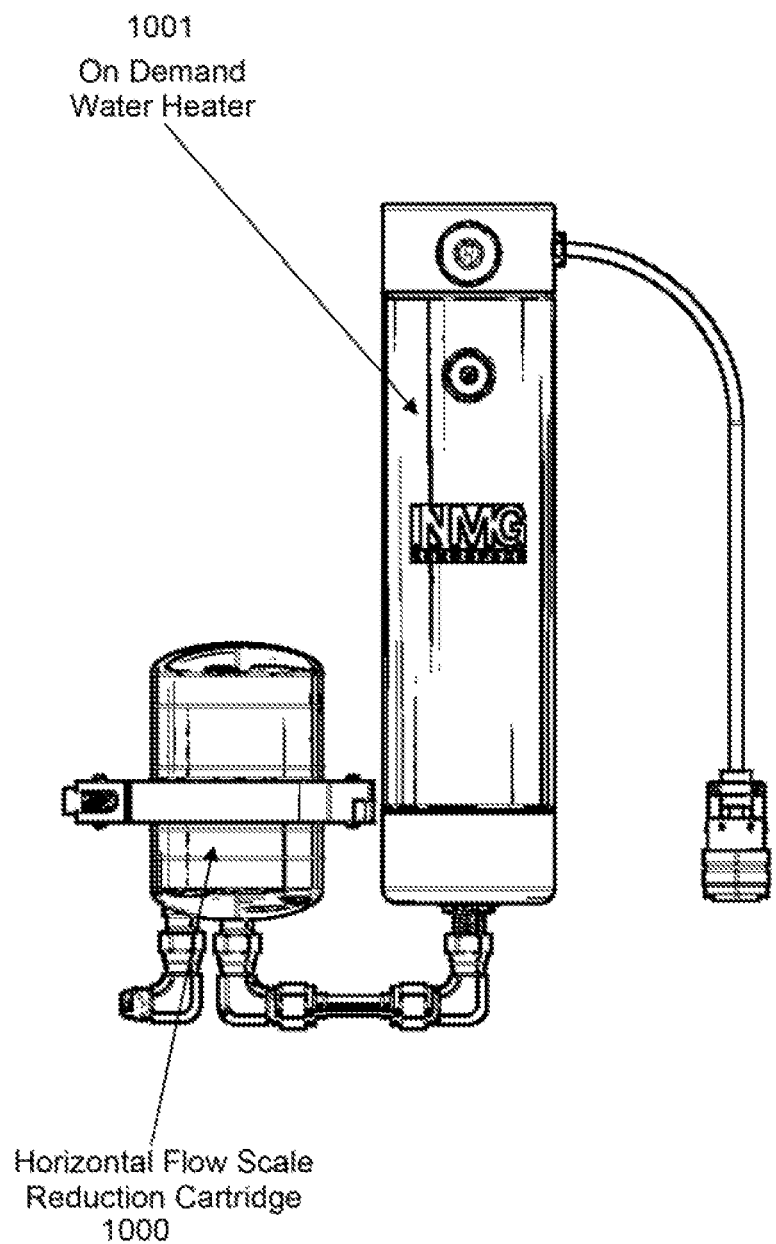
FIG. 10A is a view of a point of use scale reduction cartridge system connected to an airplane hot water heater.

FIGS. 10A-10C depict various views of an alternate scale reduction system, a horizontal flow (i.e., a point of use) cartridge system 1000 that is utilized with an on-demand fluid source, such as a water heater 1001. These figures illustrate the horizontal flow scale reduction system 1000 comprising a housing 1002, an inlet 1003, an outlet 1004, and a locking assembly 1005. This style system is termed a horizontal flow (i.e., a point of use) system, rather than an in-line system, because the inlet 1003 and the outlet 1004 are on the same side of the housing, thereby facilitating cartridge replacement. Here, the housing 1002 is a two-part housing having lid and base portions, but the housing 1002 may have other configurations. In embodiments utilizing the two-part housing 1002, a gasket may be disposed between the lid and base portions. The housing 1002 may be manufactured from any number of materials, including stainless steel, titanium, or plastic. In addition, the locking assembly 1005 may be any type of locking mechanism and, in the illustrated embodiment, is a plastic clamp.

Figure 11C:
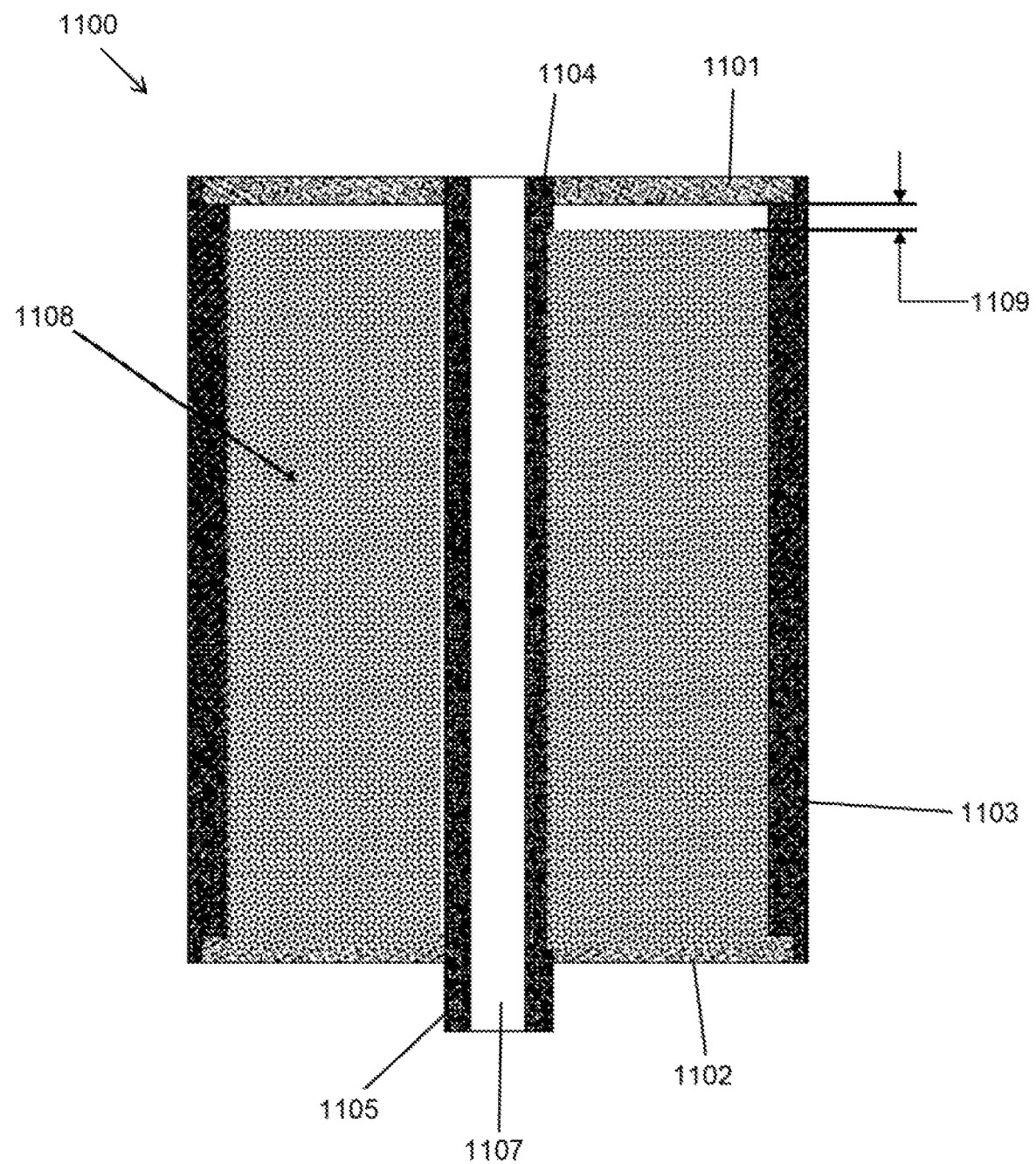
FIG. 11C is a cut away side view of the cartridge utilized in the point of use scale reduction cartridge system of FIGS. 10A through 10C.

The scale reduction system 1000 also comprises a replaceable cartridge 1100 therein. FIGS. 11A-11C illustrate the exemplary cartridge 1100 for use with the scale reduction system 1000. The cartridge 1100 comprises a top plate 1101, a bottom plate 1102, a periphery 1103 there-between, and a support member 1104 that defines a central channel 1107. As with the cartridges detailed above, the top plate 1101, the bottom plate 1102, the periphery 1103, and the support member 1104 are all constructed from a porous, hydrophobic material, which permits the elements constructed thereby to perform a pre-filtration function and reduces weight. Also in the illustrated embodiment, the porous material is porous polypropylene and, moreover, both the top plate 1101 and the bottom plate 1102 have an average pore size of 125 microns, whereas both the periphery 1103 and the support member 1104 have an average pore size of 50 microns. Therefore, in this embodiment, the top plate 1101 and the bottom plate 1102 are more porous than the periphery 1103 and the support member 1104. Also as discussed above, the top plate 1101, the bottom plate 1012, the periphery 1103, and the support member 1104 are joined by a number of welds 1106, which may comprise any welding technique known in the art that is compatible with the cartridge material, such as, for example, polyethylene welds. Alternatively, the welds 106 may be created via utilization of a glue gun with a polyethylene glue stick.

Here, the periphery 1103 is a continuous cylinder that interconnects the top plate 1101 and the bottom plate 1102; however, it will be appreciated that other geometries may be utilized depending upon the geometry of the internal cavity within housing 1002. Moreover, in this embodiment the periphery 1103 abuts the interior of the housing 1002 so that no compartment is formed there-between; however, in other embodiments such compartments may be formed there-between as previously disclosed herein.

In this embodiment, the support member 1104 includes a mounting stub 1105 and a central channel 1107. The mounting stub 1105 is located at a bottom side of the cartridge 1100 and protrudes from the bottom plate 1102 so as to be received by a mounting slot 1211 within the housing 1002, which in turn secures the cartridge 1100 within the housing 1002 and aligns the central channel 1107 with the outlet 1004 (or the inlet 1003 if reversed). The central channel 1107 extends the length of the support member 1104 from the surface of the top plate 1101, through the mounting stub 1105 so as to align and be in fluid communication with the outlet 1004 of the housing 1002 when the cartridge 1100 is installed therein.

As with the cartridge 80 of FIGS. 8A-8C, the cartridge 1100 comprises an inner cavity, which houses a chemical composition 1108 (sometimes referred to as template assisted crystallization (TAC) media). The chemical composition 1108 is mixed with the untreated inlet fluid W, so that all fluid exiting cartridge 1100 and entering equipment attached thereto, for example, a water heater 1001, is sufficiently treated. In one embodiment, the chemical composition 1108 is a water softening agent as previously discussed. Also in this embodiment, the internal cavity of cartridge 1100 is not completely filled with chemical composition 1108. As illustrated, instead of being completely filled, the cartridge 1100 cavity is filled with enough of the chemical composition 1108 such that an air gap 1109 is created. In the illustrated embodiment, the cartridge 1100 cavity is filled with one (1) quarter of a liter of chemical composition 1108; however, other quantities may be utilized depending on the application.

The air gap 1109 may facilitate mixing of the chemical composition 1108 and fluid flowing there through. Moreover, the various porosities of the cartridge 1100 may be selected such that the chemical composition 1108 particles do not clog the pores of the porous material utilized to construct the cartridge 1100. Regardless of the foregoing parameters and/or the dimensions of the cartridge 1100, however, the untreated fluid should have contact with the chemical composition 1108 for a minimum amount of time as previously disclosed (e.g., at least five (5) seconds) to ensure adequate chemical mixing. Various design modifications may be implemented to ensure adequate and sufficient chemical mixing, including (i) varying the pressure drop between the inlet 1003 and the outlet 1004, (ii) increasing or decreasing the surface area of the top and bottom plates 1101,1102 and/or (iii) enlarging or decreasing the pore sizes in the top and bottom plates 1101,1102.

Figure 12:
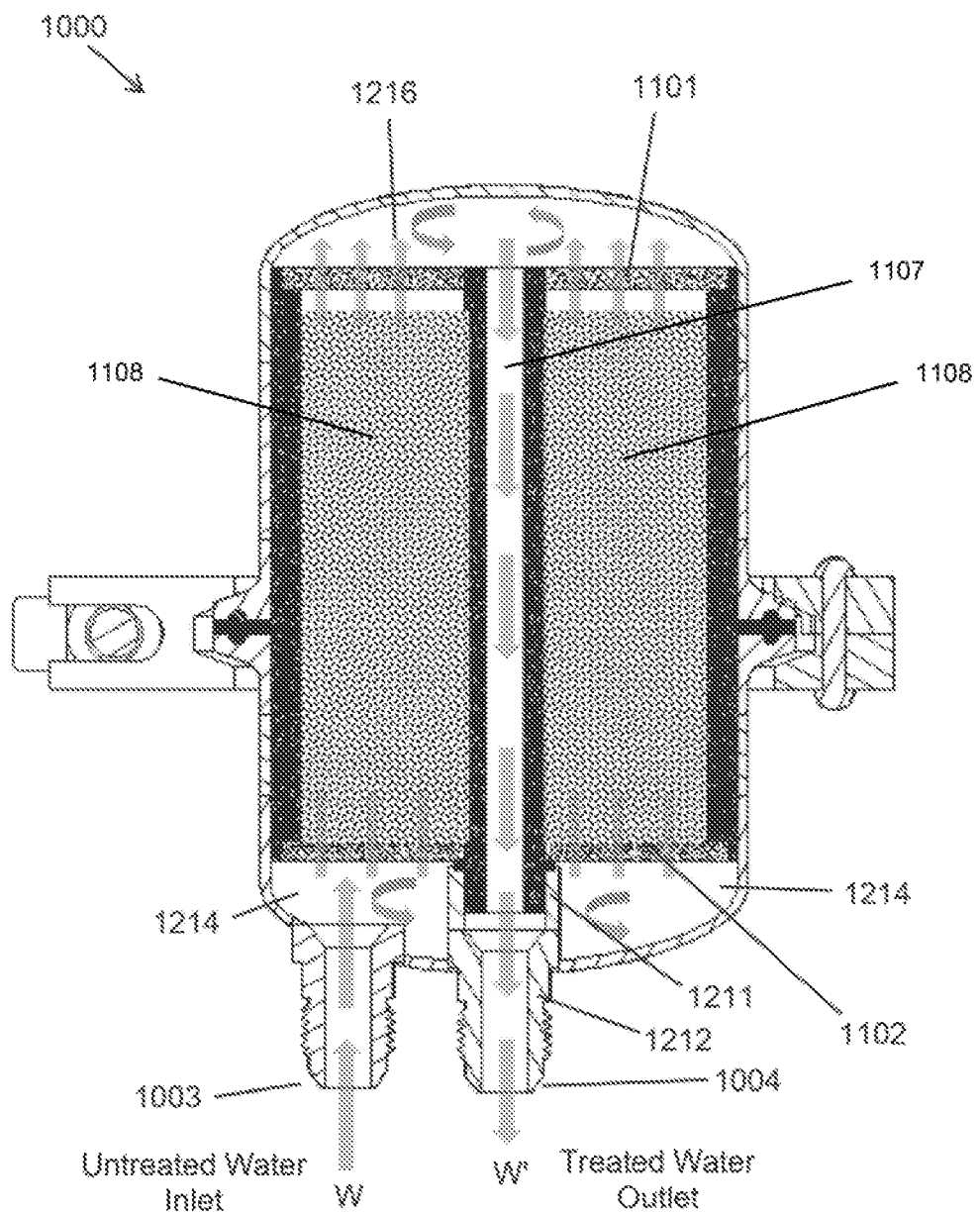
FIG. 12 is a cut away side view of the point of use scale reduction cartridge system of FIGS. 10A-10C.

FIG. 12 illustrates the fluid flow pattern inside an embodiment of the horizontal flow scale reduction system 1000. As illustrated, the stub 1105 of the cartridge 1100 is received by a mounting slot 1211 such that the cartridge 1100 is centered and secured within the housing 1002, and is not displaced therefrom. Here, the mounting slot 1211 is essentially comprised from the rear portion of an outlet cylinder 1212 that is disposed within the internal cavity of the housing 1002, whereas a front end of the outlet cylinder 1212 defines the outlet 1004. The mounting slot 1211 receives the mounting stub 1105 of the support member 1104 so that the central channel 1107 is in fluid communication with the outlet cylinder 1212 and the outlet 1004.

In use, the untreated fluid W enters the inlet 1003. From there, the untreated fluid W enters the bottom chamber 1214 as represented by the fluid flow arrows. The untreated fluid W then passes through the bottom plate 1102 and enters the chemical composition 1108 filled cavity of the cartridge 1100. When in that cavity, the fluid mixes with the chemical composition 1108 therein, and then passes through the top plate 1101 of the cartridge 1100. After sufficient mixing and treatment with the chemical composition 1108, the fluid passes through top plate 1101 and enters the top chamber 1216 as the treated fluid flow W'. The treated fluid W' then flows from the top chamber 1216, through the central channel 1107, into the outlet cylinder 1212, and then exits the scale reduction system 1000 via the outlet 1004.

In this embodiment, the pores on the top plate 1101 and the bottom plate 1102 have an average pore size of 125 microns. This pore sizing ensures that the untreated fluid W mixes with the chemical composition 1108 within the cavity of the cartridge 1100 for a sufficient amount of time and at a sufficient rate as previously disclosed. And, to increase the amount of time subject to chemical mixing, for example, either (i) the surface area of the top and bottom plates should be increased and/or (ii) the pore sizes will need to be enlarged.

Figure 13A:
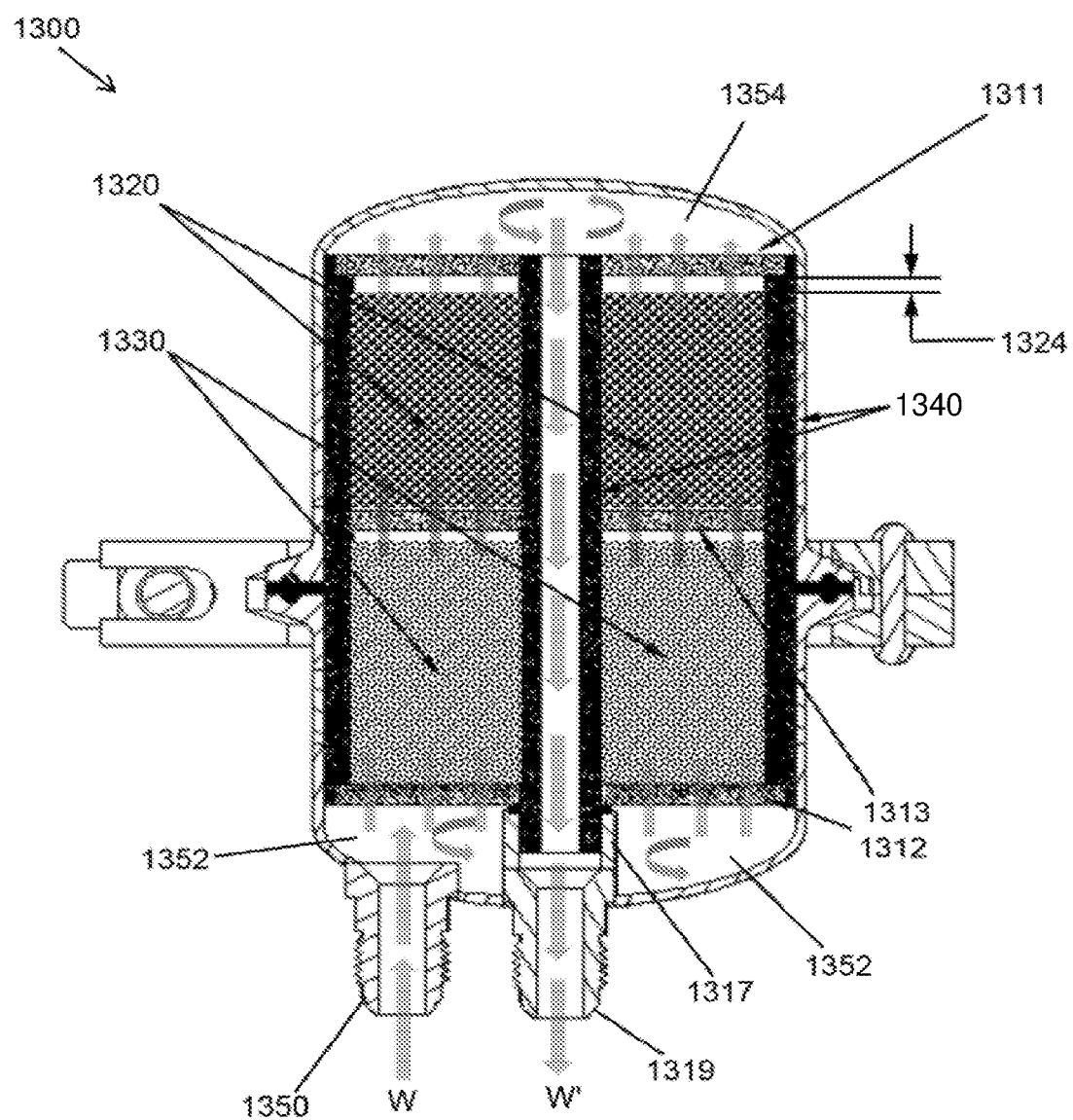
FIG. 13A depicts a cut away side view of a scale reduction system utilizing a multi compartment or multi-media cartridge.
Figure 13B:
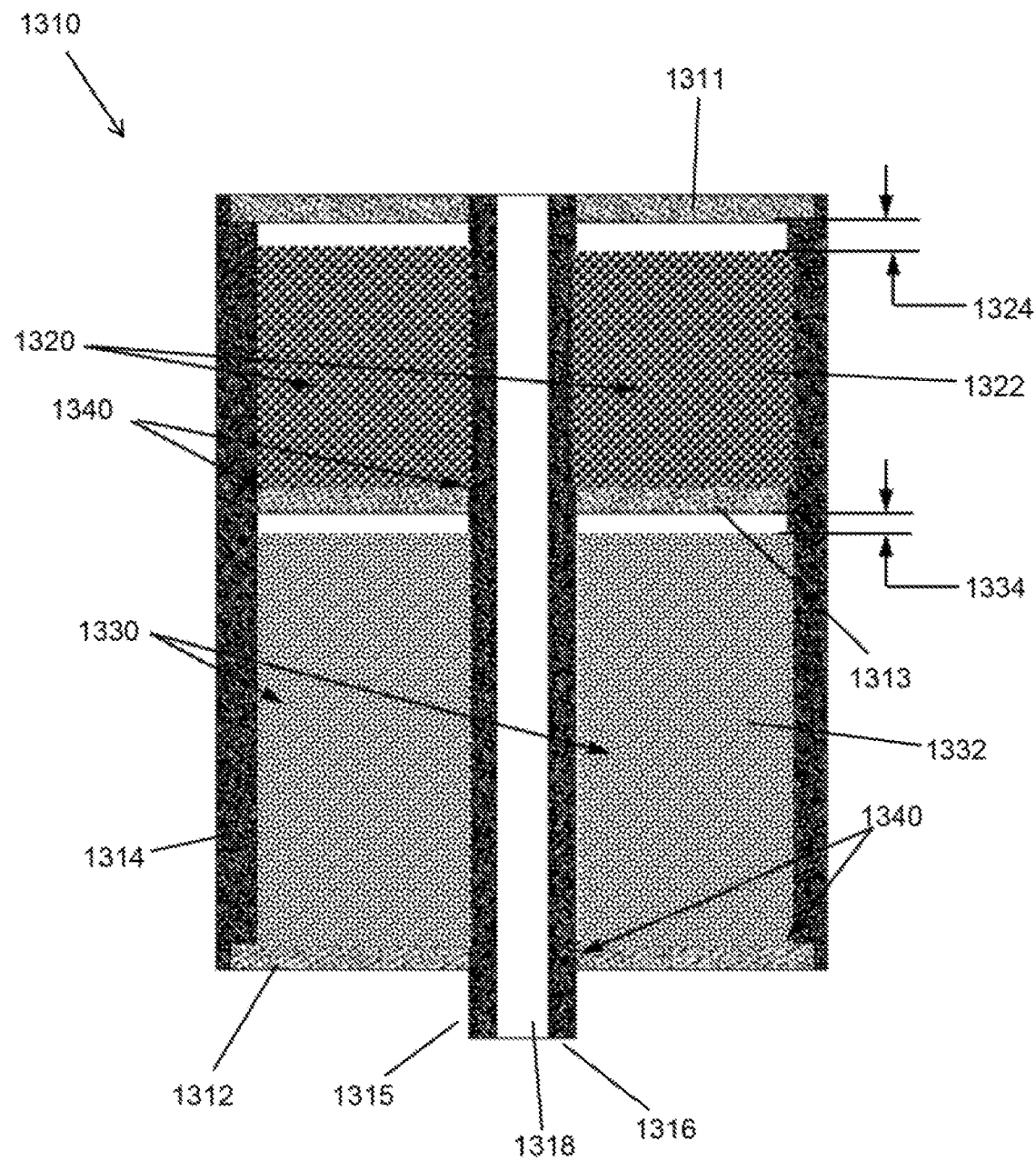
FIG. 13B depicts the cut away side view of the multi compartment or multi-media cartridge of FIG. 13A.

FIGS. 13A-13B depict yet another embodiment of a scale reduction system 1300 that includes a multi-media cartridge 1310. Here, the scale reduction system 1300 is configured as a horizontal flow (i.e., point of use) system, but it will be appreciated that multi-media cartridge 1310 may also be utilized with inline systems as previously disclosed. In addition, the multi-media cartridge 1310 includes a top plate 1311, a bottom plate 1312, a middle plate 1313 that is disposed between the top plate 1311 and the bottom plate 1312, and a periphery 1314. This arrangement of the top plate 1311, the bottom plate 1312, the middle plate 1313, and the periphery walls 1314 form two (2) distinct internal compartments or cavities, for example, a top compartment 1320 and a bottom compartment 1330. It will be appreciated, however, that the multi-media cartridge 1310 may be differently configured, for example, to comprise more than two (2) distinct internal compartments or cavities that may or may not be differently arranged.

The multi-media cartridge 1310 also comprises a support member 1315 having a mounting stub 1316 that is receivable within a housing mounting slot, such as a mounting slot 1317. These components are all joined by a number of welds 1340 as discussed above. Moreover, the support member 1315 may further comprise a central channel 1318 extending along the length thereof, for example in horizontal flow or point of use configurations, so as to align with the outlet 1319.

The top compartment 1320 and the bottom compartment 1330 are each filled with a chemical composition 1322,1332, respectively. In some embodiments, chemical compositions 1322,1332 may be the same, for example, the water softening agents previously disclosed. In the illustrated embodiment, however, the chemical compositions 1322,1332 are different. For example, the chemical composition 1332 may be a water softening agent as previously disclosed, whereas the chemical composition 1322 may be a different media that performs a different function. For example, the chemical composition 1322 may be utilized to further purify the fluid flowing there through; to remove particulate such as metals, etc.; and/or to inhibit the growth of algae, fungi, bacteria, etc. In one embodiment, the chemical composition 1322 is a redox purification media such as KDF 55. Regardless of which of the chemical compositions 1322,1332 are utilized, the top compartment 1320 and the bottom compartment 1330 may be filled with enough of the chemical compositions 1322,1332, respectfully, such that air gaps 1324 and 1334 are formed. These air gaps 1324 and 1334 may facilitate the mixing of chemical compositions 1322,1332 with the fluid flowing there through. In the illustrated embodiment, the top compartment 1320 and the bottom compartment 1330 are each filled with one (1) quarter of a liter of the chemical composition 1322,1332, respectfully; however, other quantities may be utilized depending on the application.

In use, the untreated fluid W enters the inlet 1350. From there, the untreated fluid W enters the bottom chamber 1352 as represented by the fluid flow arrows. The untreated fluid W then passes from the bottom chamber 1352, through the bottom plate 1312, and enters the bottom compartment 1330 which is filled with a volume of the chemical composition 1332. When in that bottom compartment 1330, the fluid mixes with the chemical composition 1332 therein, and then passes through the middle plate 1313 and into the upper compartment 1320 that is filled with a volume of the chemical composition 1322. In the upper compartment 1320, the fluid mixes with the chemical composition 1322 therein, and then passes through the upper plate 1311 and into the top chamber 1354 as the treated fluid flow W'. The treated fluid W' then flows from the top chamber 1354, through the central channel 1318, and then exits the scale reduction system 1300 via the outlet 1319.

While principles and modes of operation have been explained and illustrated with regard to particular embodiments, it must be understood, however, that this may be practiced otherwise than as specifically explained and illustrated without departing from its spirit or scope. Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A scale reduction system comprising:
   a housing having an inlet and an outlet that are fluidly interconnected by a recess within the housing;
   a cartridge removably provided within the recess of the housing and comprising a first porous plate and a second porous plate that each include an inner and an outer face, a porous sidewall extending between the inner faces of the first and second porous plates, wherein the first porous plate, the second porous plate and the porous sidewall define a first inner volume of the cartridge, and allow fluid to enter and exit the cartridge, wherein the cartridge is fully covered by the housing when installed in the housing, and wherein the first inner volume is configured to house a first chemical composition, and wherein the first porous plate has a pore size configured to prevent the first chemical composition from passing through the first porous plate.

2. The scale reduction system of claim 1, wherein the first chemical composition is a powdered media.

3. The scale reduction system of claim 1, wherein the first chemical composition comprises a water softening agent.

4. The scale reduction system of claim 3, wherein the water softening agent is chosen from the group consisting of Eagle® sorb ES3 Anti-Scale or SCALENET™, and any combination thereof.

5. The scale reduction system of claim 1, wherein the cartridge further comprises:
    a third porous plate disposed along the porous sidewall at a location between the first and second porous plates so as to define a second inner volume of the cartridge that is separate of the first inner volume; and
    a second chemical composition contained within the second inner volume.

6. The scale reduction system of claim 5, wherein the first chemical composition and the second chemical composition are the same.

7. The scale reduction system of claim 5, wherein the second chemical composition is a redox purification media.

8. The scale reduction system of claim 7, wherein the redox purification media is KDF 55.

9. The scale reduction system of claim 1, wherein the cartridge further comprises a support member extending between the inner faces of the porous plates parallel to the sidewalls.

10. The scale reduction system of claim 9, wherein the support member defines a central channel, the central channel having an opposing first and second end, the first end in alignment with a flow aperture of the first porous plate and the second end in alignment with a flow aperture of the second porous plate.

11. The scale reduction system of claim 1, wherein the first and second porous plates each have a plurality of radial slots located along a respective circumference of the first and second porous plates.

12. The scale reduction system of claim 11, wherein the plurality of radial slots located radially along the circumference of the first porous plate are not in alignment with the plurality of radial slots located radially along the circumference of the second porous plate.

13. The scale reduction system of claim 1, the first porous plate further comprising a first porosity, the second porous plate further comprising a second porosity, and the porous sidewall further comprising a third porosity, wherein the second and third porosities are equal.

14. The scale reduction system of claim 13, wherein the second and third porosities are more porous than the first porosity.

15. The scale reduction system of claim 13, wherein the cartridge further comprises:
    a third plate disposed along the porous sidewall at a location between the first and second plates so as to define a second inner volume of the cartridge that is separate of the first inner volume; and
    a second chemical composition contained within the second inner volume; and
    wherein the third plate further comprises a fourth porosity that is different from the first and second porosities.

16. The scale reduction system of claim 1 wherein the housing is a two-part housing that further comprises a first part and a second part that mates with the first part via a locking assembly.

17. The scale reduction system of claim 16, further comprising a gasket disposed between the first part and the second part.

18. The scale reduction system of claim 1, wherein the first chemical composition comprises a plurality of beads.

19. The scale reduction system of claim 1, wherein the first inner volume is positioned within a fluid passageway defined by the recess and cartridge such that the first chemical composition is mixed with untreated inlet fluid flow to produce a chemical solution of a desired concentration to reduce scale formation based on the first chemical composition being positioned within the first inner volume and the untreated inlet fluid being introduced into the scale reduction system via the inlet.

20. The scale reduction system of claim 1, further comprising:
    a first chamber defined by the first porous plate an inner surface of the recess that at least partially surrounds the cartridge, wherein the first chamber is in fluid communication with the outlet;
    a second chamber defined by the second porous plate and the inner surface of the recess, wherein the second chamber is in fluid communication with the inlet; and
    a third chamber defined by the porous sidewall and the inner surface of the recess, wherein the third chamber is in fluid communication with the first inner volume.

* * * * *